United States Patent
Kameyama et al.

(10) Patent No.: US 6,961,217 B2
(45) Date of Patent: Nov. 1, 2005

(54) HEAD SLIDER AND DISK DRIVE EMPLOYING SAME HEAD SLIDER, AND METHOD FOR PROVIDING WATER REPELLENT TREATMENT TO SAME HEAD SLIDER

(75) Inventors: Masaki Kameyama, Kawasaki (JP); Chiharu Nakata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/436,188

(22) Filed: May 12, 2003

(65) Prior Publication Data

US 2003/0189794 A1 Oct. 9, 2003

Related U.S. Application Data

(63) Continuation of application No. PCT/JP00/08135, filed on Nov. 17, 2000.

(51) Int. Cl.$^7$ .......................... G11B 5/60; G11B 15/64; G11B 17/32; G11B 21/20
(52) U.S. Cl. ................ 360/235.6; 360/236.6; 360/236.3; 360/236.4
(58) Field of Search .................. 360/235.5, 235.6, 360/235.7, 235.8, 235.9, 236, 236.1, 236.2, 236.3, 236.4

(56) References Cited

U.S. PATENT DOCUMENTS

| | | | | |
|---|---|---|---|---|
| 5,210,666 A | * | 5/1993 | Chapin et al. | 360/235.6 |
| 5,515,219 A | * | 5/1996 | Ihrke et al. | 360/236.1 |
| 6,021,020 A | * | 2/2000 | Itoh et al. | 360/236.1 |
| 6,034,842 A | * | 3/2000 | Cha | 360/235.6 |
| 6,055,128 A | * | 4/2000 | Dorius et al. | 360/235.8 |
| 6,172,851 B1 | * | 1/2001 | Utsunomiya | 360/236.3 |
| 6,229,671 B1 | * | 5/2001 | Boutaghou et al. | 360/235.1 |
| 6,317,294 B1 | * | 11/2001 | Wada et al. | 360/235.6 |
| 6,445,542 B1 | * | 9/2002 | Levi et al. | 360/236.5 |
| 6,459,546 B1 | * | 10/2002 | Mundt et al. | 360/236.3 |
| 6,462,909 B1 | * | 10/2002 | Boutaghou et al. | 360/235.8 |
| 6,490,135 B1 | * | 12/2002 | Sannino et al. | 360/235.8 |
| 6,504,682 B1 | * | 1/2003 | Sannino et al. | 360/235.8 |

FOREIGN PATENT DOCUMENTS

| | | | | |
|---|---|---|---|---|
| JP | 03-268265 | | 11/1991 | |
| JP | 09115117 A | * | 5/1997 | G11B/5/41 |
| JP | 09198637 A | * | 7/1997 | G11B/5/60 |
| JP | 10283622 A | * | 10/1998 | G11B/5/60 |
| JP | 11-016313 | | 1/1999 | |
| JP | 11-025631 | | 1/1999 | |
| JP | 11-053727 | | 2/1999 | |
| JP | 11-144416 | | 5/1999 | |
| JP | 11144418 A | * | 5/1999 | G11B/21/21 |
| JP | 11149734 A | * | 6/1999 | G11B/21/21 |
| JP | 11-191276 | | 7/1999 | |
| JP | 11283347 A | * | 10/1999 | G11B/21/21 |
| JP | 2000021109 A | * | 1/2000 | G11B/21/21 |
| JP | 2000-173217 | | 6/2000 | |
| JP | 2000-306226 | | 11/2000 | |

* cited by examiner

*Primary Examiner*—William J Klimowicz
(74) *Attorney, Agent, or Firm*—Greer, Burns & Crain, Ltd.

(57) ABSTRACT

With a view to providing a head slider which can suppress the adhesion of dust particles to a flying surface of the head slider when the head slider flies and a disk drive employing the same head slider, a head slider in which at least an air bearing portion and a land portion for forming a vacuum area on the flying surface are provided on the flying surface of the head slider, the land portion being formed in such a manner as to have a difference in level so as to be closer by a step to a disk medium than an end surface of the slider base, wherein the water repellency of an end surface of the land portion and the water repellency of the end surface of the slider base are made higher than the water repellency of the air bearing portion. As this occurs, the water repellency of the end surface of the land portion is increased more than the water repellency of the air bearing portion, whereby the water repellency of the end surface of the slider base can be increased more than the water repellency of the end surface of the land portion.

7 Claims, 22 Drawing Sheets

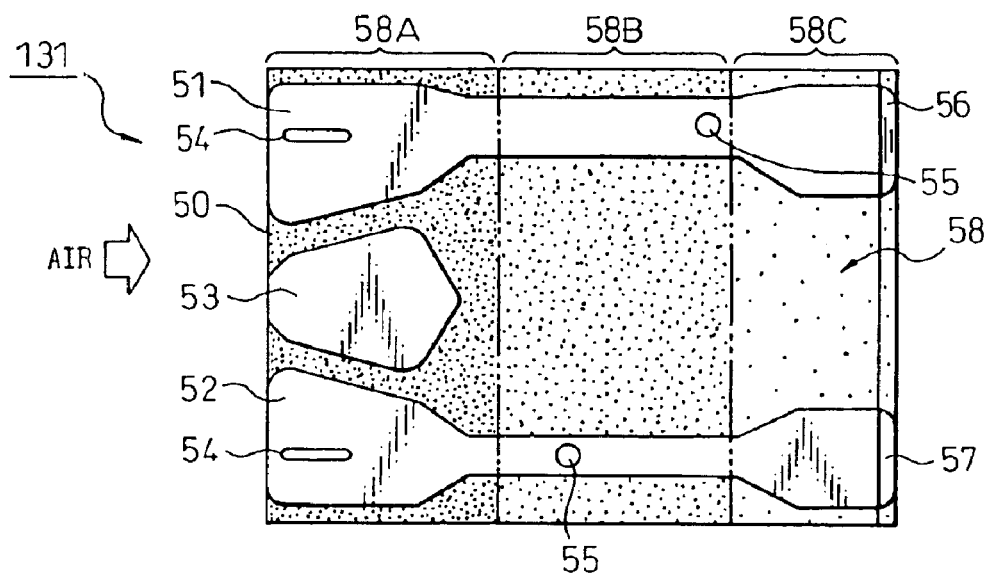
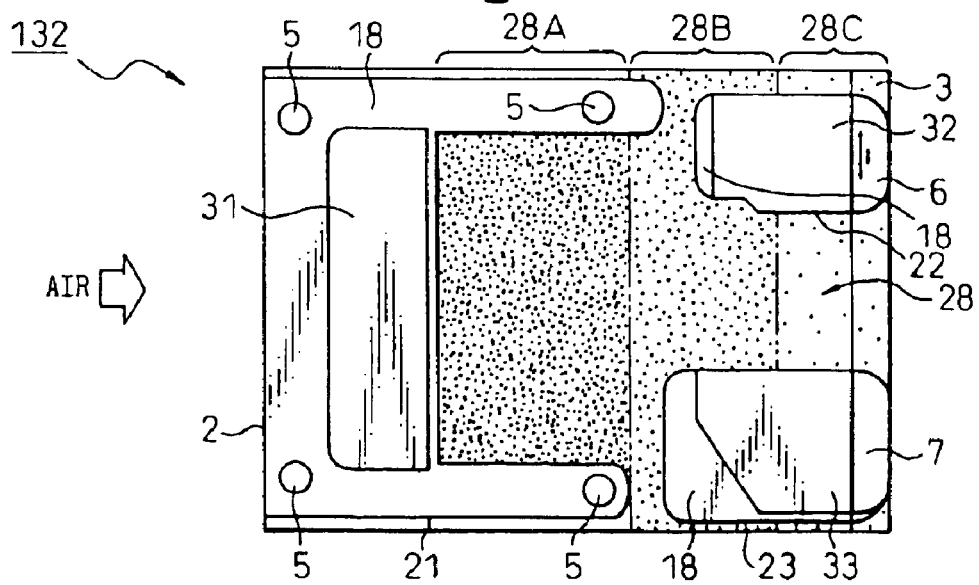

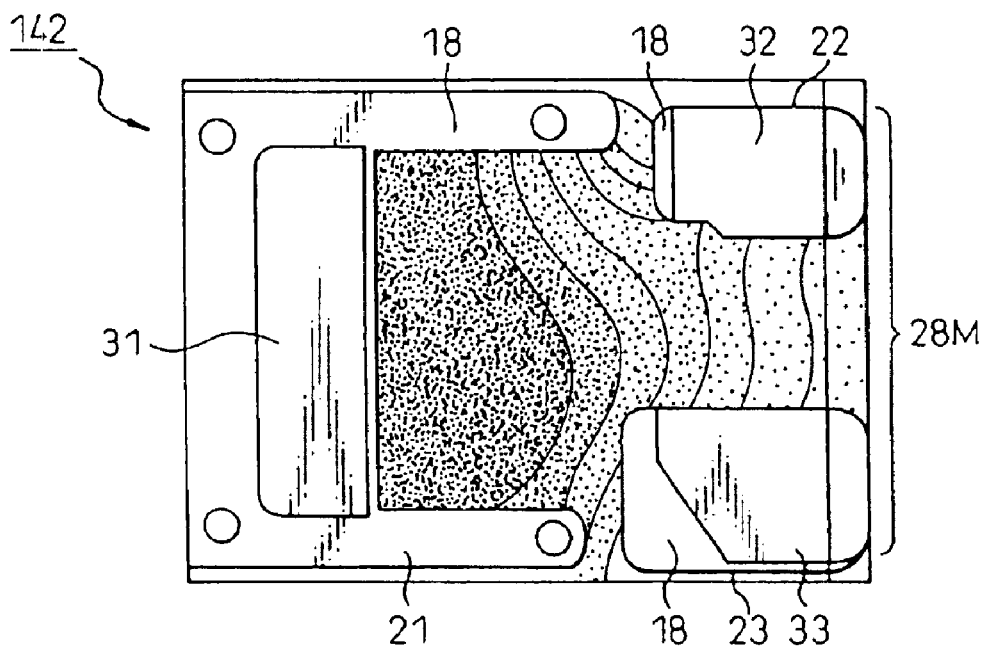
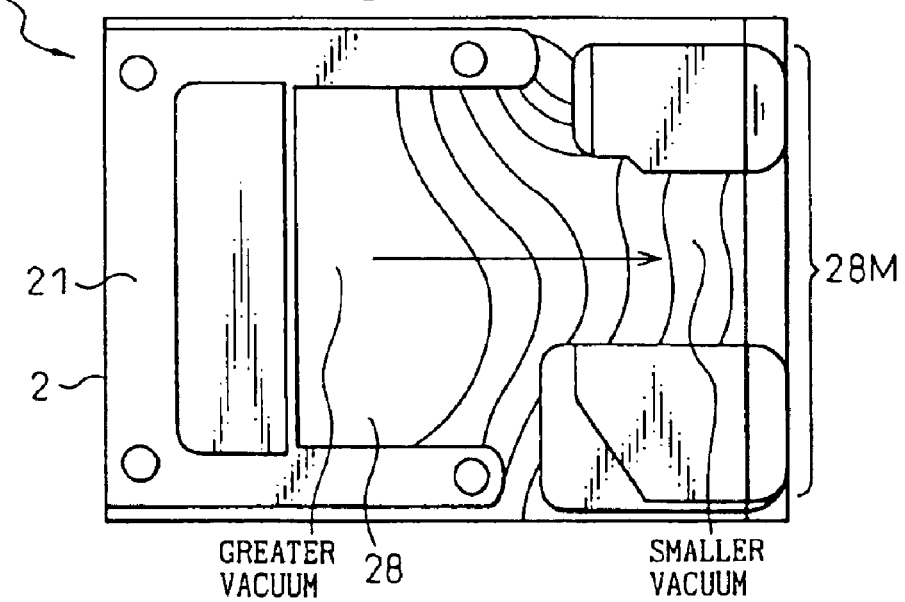

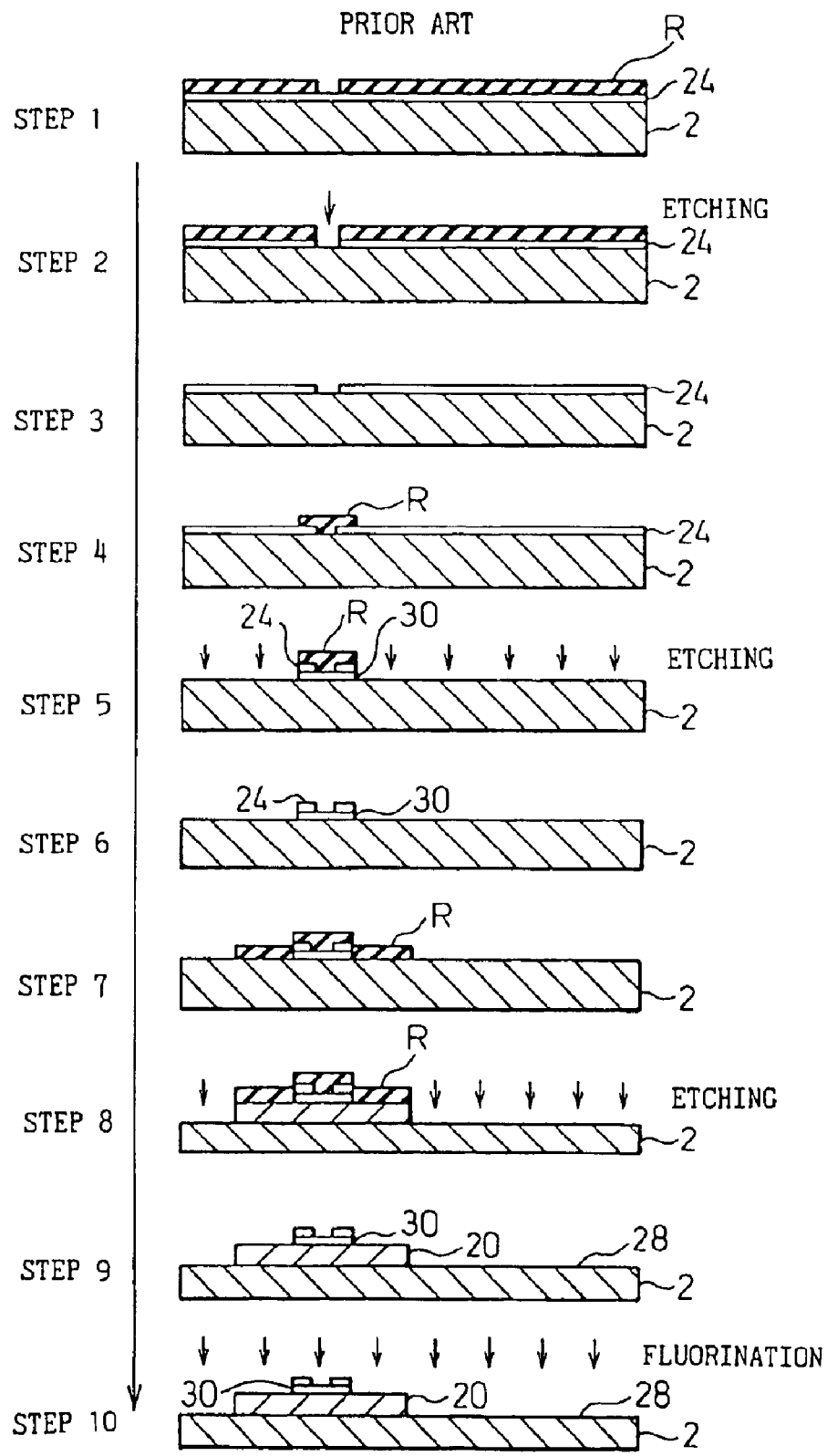

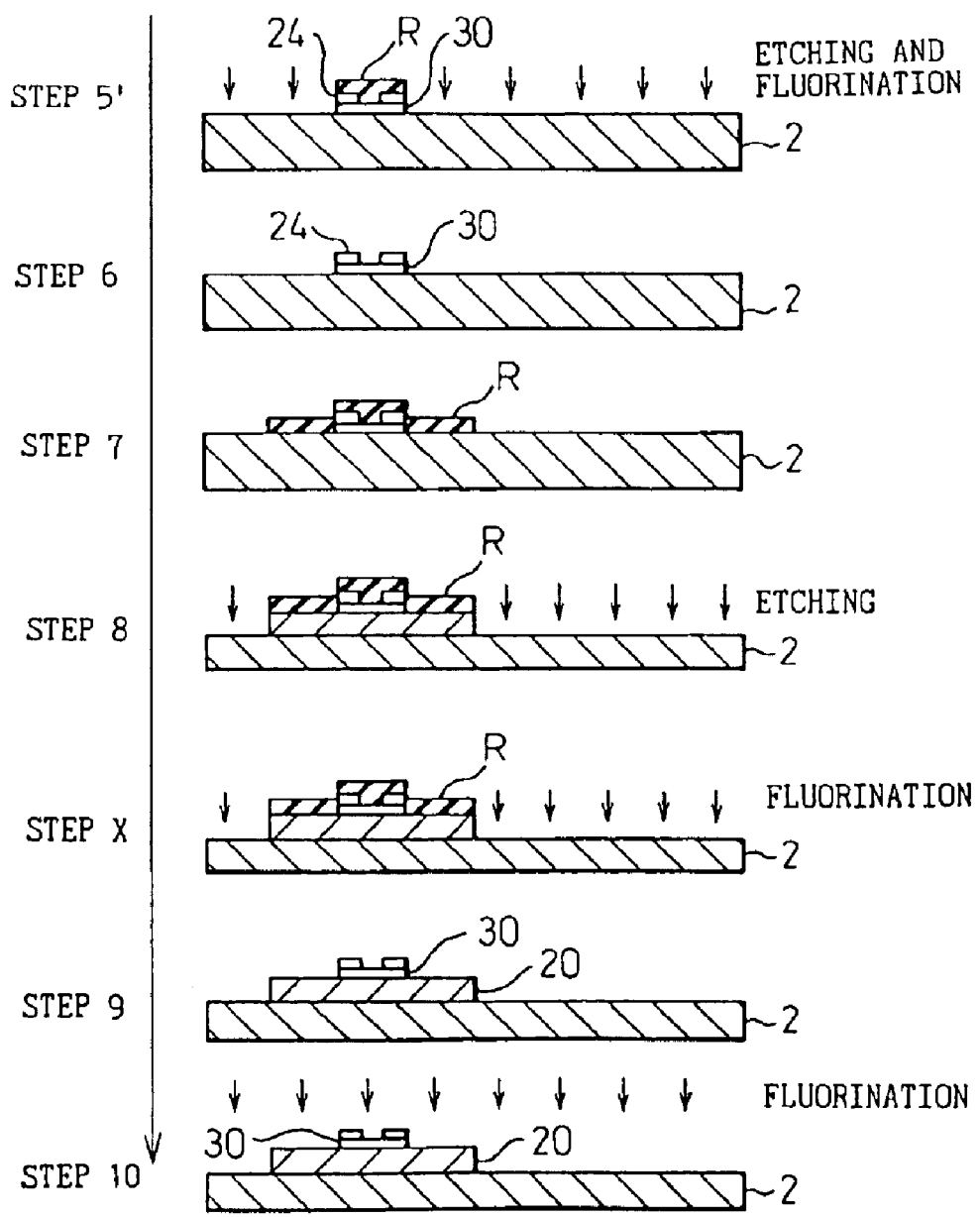

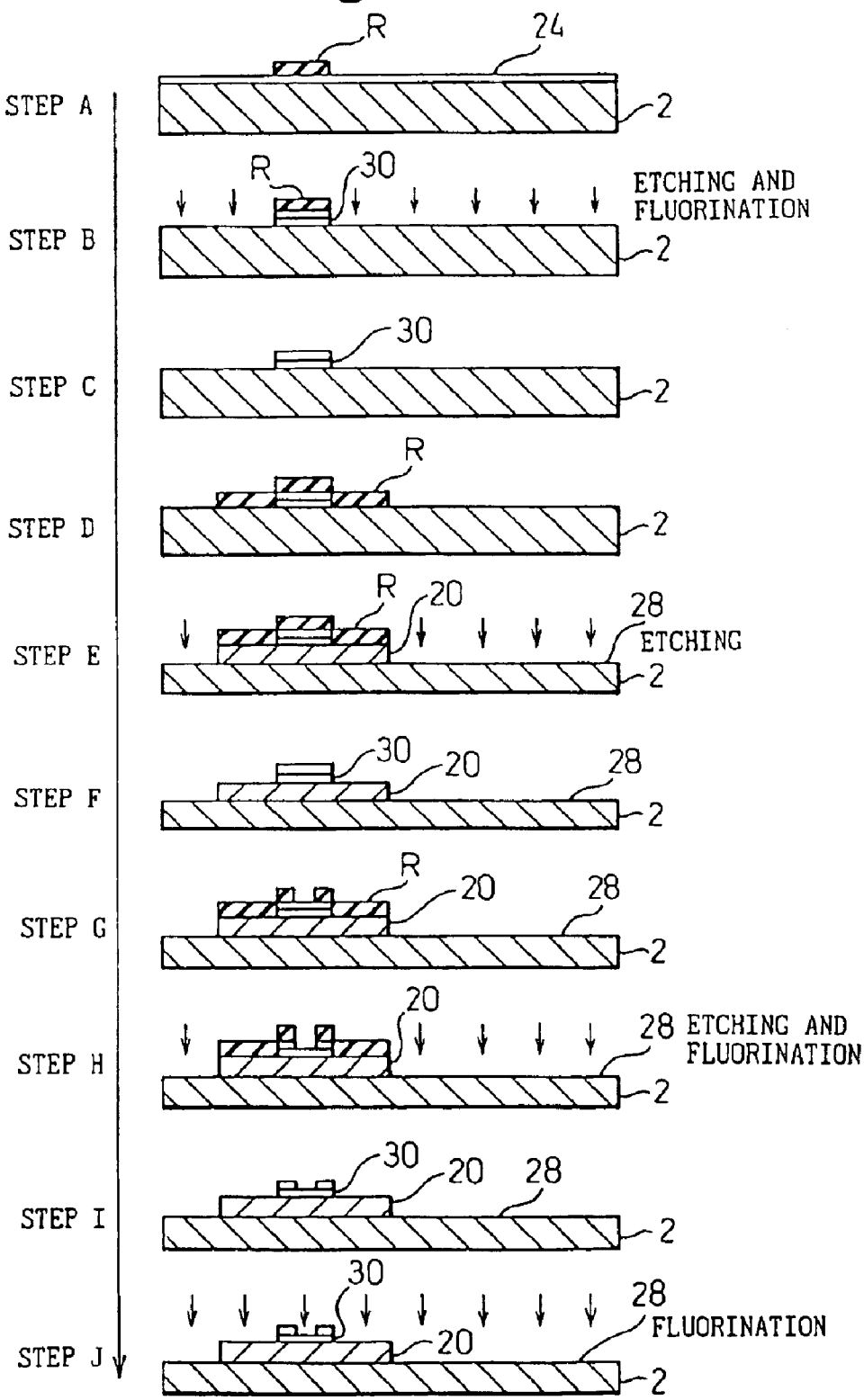

HEAD SLIDER AND DISK DRIVE EMPLOYING SAME HEAD SLIDER, AND METHOD FOR PROVIDING WATER REPELLENT TREATMENT TO SAME HEAD SLIDER

CROSS-REFERENCE TO RELATED APPLICATIONS

This application is a continuation application based upon PCT/JP00/08135 filed on Nov. 17, 2000.

FIELD OF THE INVENTION

The present invention relates to a head slider and a disk drive employing the same head slider, a method for providing a water repellent treatment to the head slider and, more particularly, to a head slider which can reduce a sticking force or a stiction resulting from the contact of the head slider with a magnetic recording medium when a magnetic disk drive starts up or stops and a disk drive employing the same head slider, and a method for providing a water repellent treatment to the head slider.

DESCRIPTION OF RELATED ART

In recent years, as magnetic disk drives have been made smaller in size while their capacities have been increased, various innovative technologies have been introduced in order to provide faster and more reliable magnetic disk drives. In addition, similar technology innovations have been demanded for disk media to or from which data is written or read.

Incidentally, as the magnetic disk drives have been made smaller in size while their capacities have been increased, flying heights of heads thereof have been decreased, and as the flying heights of the heads have been so decreased, the surfaces of disk media have been made smoother. The head is mounted on a distal end portion of a head slider and is made to fly above a disk medium, by the slider, with an extremely small gap relative to the disk medium while a magnetic disk drive is in operation, whereby the head so positioned writes or reads data to or from the disk medium.

In conventional head sliders, a step-like difference in level is provided on the flying surface (a surface facing a disk medium) of the head slider in order to reduce the flying amount of the head slider above the disk medium, and a vacuum area is formed on the flying surface by this difference in level. However, dust particles, composed of a material such as a liquid lubricant, tend to adhere to the vacuum area on the head slider, and since there may be caused a risk that the dust particles so adhering to the vacuum area drop onto the head medium to thereby trigger a head crash, countermeasures against the risk have been desired.

A head of the conventional magnetic disk drive for writing or reading data to or from a disk medium is mounted on the head slider. The head slider is supported by a head suspension, and when the head writes or reads data to or from the disk medium the head performs such writing or reading operation with the head slider being kept in the flying condition above the disk medium.

Due to this, air bearing portions and land portions are provided (normally, both the air bearing portions and the land portions are provided in plural numbers) on the flying surface of the head slider above the disk medium (a bottom surface of a slider base) for appropriately maintaining the flying posture of the head slider in the flow of air produced when the disk medium rotates. In addition, in the conventional head sliders, a water repellent treatment was normally provided only to the surface of the air bearing portion which is situated closest to the disk medium.

However, conventionally, a vacuum generating area is provided at a central portion of the bottom surface of the slider base to reduce the flying amount of the head slider above the disk medium, and since no water repellent treatment is provided, in general, to this vacuum generating area, there has been caused a problem that dust particles tend to easily adhere to the central portion of the bottom surface of the slider base. Namely, dust particles constituted by a material such as a liquid lubricant adhere to accumulate on the vacuum generating area of the head slider as the head slider performs such operations as contact start and stop (CSS), and seek in the magnetic disk drive and, in the event that the amount of dust particles so accumulated on the vacuum generating area exceeds an allowable amount, then there is caused a problem that some of the dust particles so adhering drop onto the surface of the disk medium to thereby trigger a head crash.

SUMMARY OF THE INVENTION

Then, an object of the present invention is to provide a head slider and a disk drive employing the same head slider, and a method for providing a water treatment to the head slider, the head slider being an improved head slider in which at least a step-like stepped portion is provided on a slider base of a head slider so as to reduce the flying amount of the head slider in order to allow the provision of a disk drive having a higher density, wherein the adhesion of dust particles to a flying surface of the head slider when the head slider flies can be suppressed.

The present invention which can attain the above object is described in the form of the following embodiments.

According to a first embodiment of a head slider of the invention, there is provided a head slider comprising a plurality of flat steps formed at an air inlet end of a flying surface of the head slider accessing a disk medium which faces the disk medium in such a manner as to be stepped gradually from a slider base and a vacuum area formed on the flying surface of the head slider which faces the disk medium at a downstream end of an air flow flowing through the steps, wherein at least a groove for introducing air to the vacuum area is formed in the step having a longest distance from the slider base in such a manner that the depth of the groove so formed reaches at its maximum the surface of the step having a second longest distance from the slider base.

According to a second embodiment of a head slider of the invention, there is provided a head slider as set forth in the first embodiment of the invention in which the plurality of steps comprise a first step and a second step which is formed on a side which allows the second step to be closer to the disk medium by one step than the first step, in which end portions of the first step are extended toward the downstream end of the air flow so as to form rail portions, in which a land portion comprising a plurality of flat steps is formed further at a downstream end of each of the rail portions, and in which a third step which is the step of the steps formed on each of the land portions which is situated closest to the disk medium has the same height as that of the second step, wherein a water repellency provided to the second and third steps can be increased higher than water repellencies provided to other portions of the flying surface.

According to a third embodiment of the invention, there is provided a head slider in which at least a land portion is provided on a flying surface of the head slider accessing a disk medium for forming a vacuum area on the flying surface, the land portion comprising at least a flat step formed thereon in such a manner as to be gradually closer to the disk medium than a slider base, wherein water repellencies provided to other portions of the flying surface are increased to higher than a water repellency provided to the step situated at a position having a longest distance from the slider base.

In the first to third embodiments, a porous polymer layer can be provided at an end portion of an air outlet end of the head slider.

With a view to attaining the aforesaid object, a magnetic disk drive according to the invention adopts a head slider as set forth in the first to third aspects of the invention.

In this disk drive, a head cleaning mechanism can be provided in the vicinity of a CSS zone or a loading and unloading area where the head slider comes to rest for fixing the head slider in the CSS zone or loading and unloading area and wiping off dirt adhering to the end portion of the air outlet end of the head slider.

With a view to attaining the aforesaid object, according to a first embodiment of a method of the invention for providing a water repellent treatment to the head slider, in forming the steps utilizing a photolithography technique, a water repellent treatment is provided to the surface of the head slider with an RIE using a fluorine reaction gas in a state in which a shielding resist is left immediately after a vacuum generating area has been formed by an ion mill.

In addition, with a view to attaining the aforesaid object, according to a second embodiment of a method of the invention for providing a water repellent treatment to the head slider in which a protection film is provided on the steps, and in which part of the protection film is removed using the photolithography technique, wherein a water repellent treatment is provided to portions of the head slider other than the uppermost step at the same time as part of the protection film is removed with a RIE using a fluorine reaction gas.

According to the invention, there can be provided the head slider which can suppress the adhesion of dust particles to the flying surface of the head slider when it flies and the disk drive employing the head slider, and the method for providing a water repellent treatment to the head slider.

BRIEF DESCRIPTION OF THE DRAWINGS

The above and other objects, features and advantages of the present invention will be described in detail below according to embodiments shown in the accompanying drawings, wherein.

FIG. 6A is a bottom view of a head slider according to a first example of a third embodiment of the present invention.

FIG. 6B is a bottom view of a head slider according to a second example of the third embodiment of the present invention.

FIG. 8A is a bottom view of a head slider according to a second example of the fourth embodiment of the present invention.

FIG. 8B is a bottom view showing a vacuum distribution on a flying surface of the head slider shown in FIG. 8A when the head slider flies.

FIGS. 21A to 21D are explanatory views explaining the operations of the cleaning mechanism of the head slider shown in FIG. 20, wherein FIG. 21A is an explanatory view showing a state in which the head slider is situated above a disk medium, FIG. 21B is an explanatory view showing a state in which the head slider is moved in a circumferential direction of the disk medium, and a guide bar provided on the head slider rides on a guide slope, FIG. 21C is an explanatory view showing a state in which the head slider is being cleaned with a cleaning roller at a cleaning position, and FIG. 21D is a partial side view of FIG. 21C.

FIG. 22 is a process diagram explaining the steps of a conventional process for providing a water repellent treatment to a bottom surface of a head slider.

FIG. 23 is a process diagram showing the steps of a first embodiment of a process for providing a water repellent treatment to a bottom surface of a head slider according to the present invention.

FIG. 24 is a process diagram showing the steps of a second embodiment of a process for providing a water repellent treatment to a bottom surface of a head slider.

BEST MODE FOR CARRYING OUT THE INVENTION

Before embodiments of the present invention are described in detail, based on specific examples with reference to the accompanying drawings, the problems inherent in a head slider of a conventional disk drive will be described with reference to the drawings.

Figure 1:
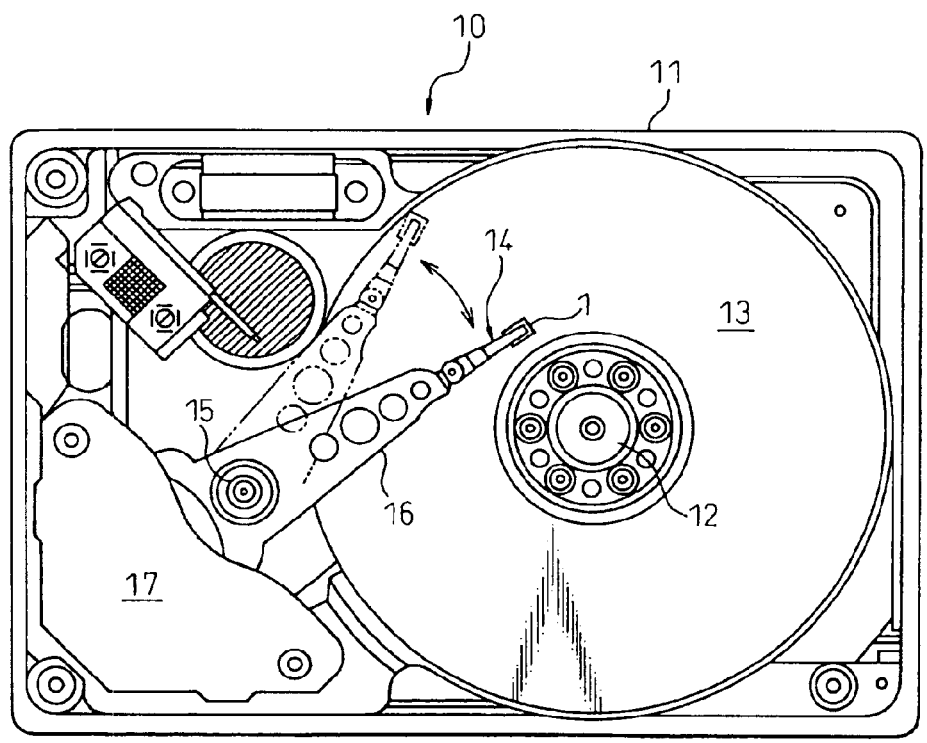
FIG. 1 is a plan view showing the general construction of a disk drive.

FIG. 1 shows the general construction of a conventional magnetic disk drive 10. In the magnetic disk drive 10, a spindle motor 12 is provided in a housing 11 of the magnetic disk drive 10, and at least a magnetic disk medium 13 is attached to the spindle motor 12. The magnetic disk medium 13 is intended to record data thereon, and a head attached to a head slider 1 reads data recorded on the disk medium 13 therefrom and writes data to the disk medium 13. The number of head sliders 1 corresponds to the number of disk media 13.

The head slider 1 is supported by a head suspension 14 and is constructed to move in radial directions shown in arrows over the disk medium 13. When the head on the head slider 1 operates to perform reading data from the disk medium 13 or writes data to the disk medium 13, the head slider 1 performs the data reading or data writing operation while it is flying above the disk medium 13. The head suspension 14 is mounted on a carriage 16 which can swing around a rotating shaft 15. A coil is provided on the carriage 16 on an opposite side to the side thereof where the head suspension 14 is mounted, and this coil is adapted to be driven by a voice coil motor 17.

Figure 2A:
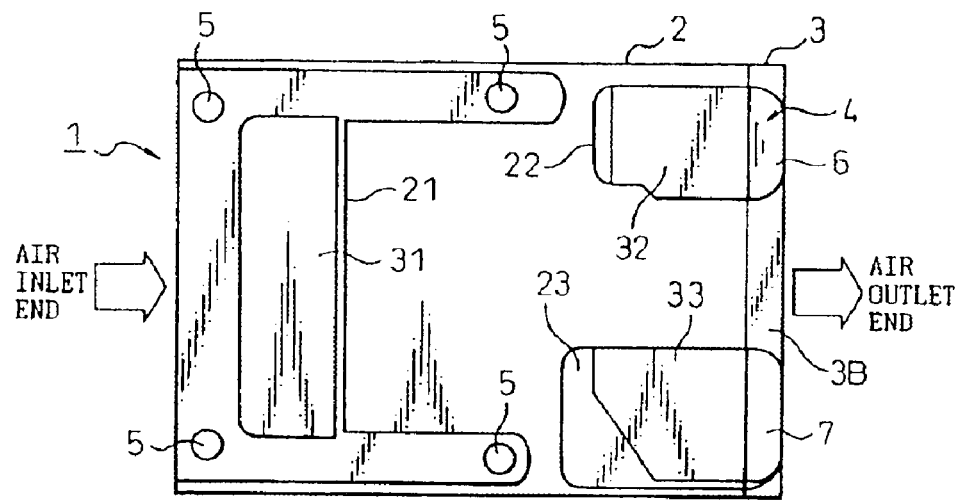
FIG. 2A is a bottom view of a conventional head slider for use in the disk drive.
Figure 2B:
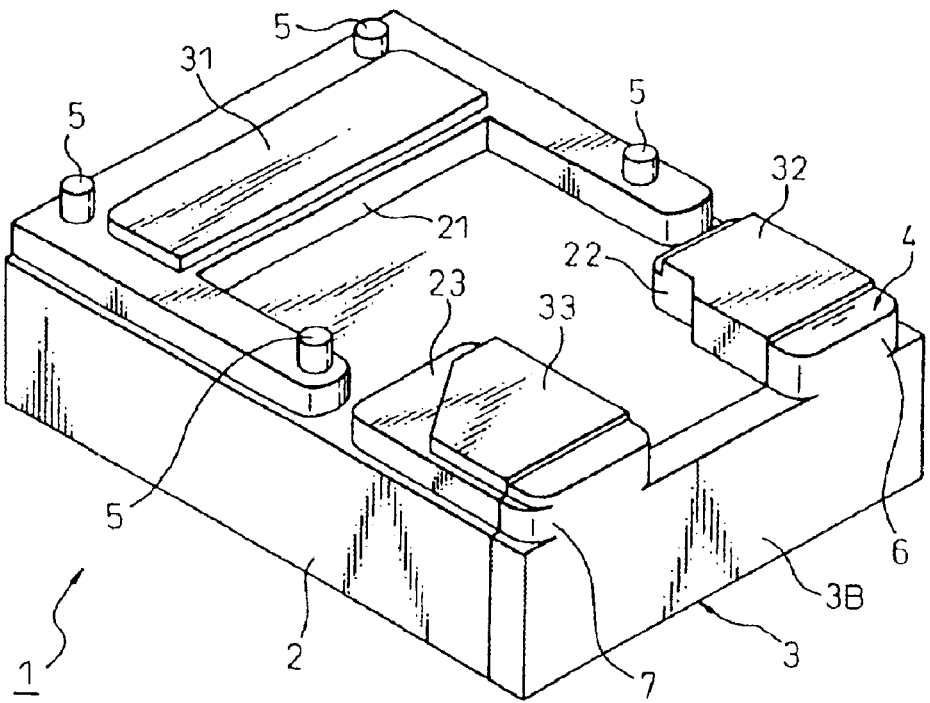
FIG. 2B is a perspective view of the head slider shown in FIG. 2 as viewed from a head side.

FIGS. 2A and 2B show the construction on a bottom side of the conventional head slider 1 for use in a magnetic disk drive 10 as described in FIG. 1. The head slider 1 is constituted by a slider base 2 and a head unit 3 mounted on the head slider base 2. The slider base 2 is formed from ferrite. Additionally, in this embodiment, a head 4 provided on the head unit 3 is a composite head comprising a GMR head and an inductive head.

A substantially portal-type first land portion 21 is provided on a side of the slider base 2 which confronts the disk medium at an air inlet end of the slider base 2 where air is let in when the disk medium rotates, and second and third land portions 22, 23 are provided on the same side of the slider base 2 at an air outlet end thereof. The heights of the surfaces of the first to third land portions 21 to 23 which confront the disk medium (hereinafter, referred to as end surfaces) from the slider base 2 are identical. In addition, a first air bearing portion 31 is provided on the end surface of the first land portion 21, a second air bearing portion 32 is provided on the end surface of the second land portion 22, and a third air bearing portion 33 is provided on the end surface of the third land portion 23. End surfaces of the first to third air bearing portions 31 to 33 are flat, and the heights thereof from the slider base 2 are identical. Furthermore, a pad 5 is provided at each of four corners of the first land portion 21 in such a manner as to protrude upwardly therefrom. These four pads 5 are intended to reduce a stationary friction force produced between the head slider 1 and the disk medium when the head slider 1 rests on a disk medium which has stopped rotating. Consequently, the heights of the four pads 5 are identical.

The head unit 3 is constituted by a base portion 3B which is superimposed on the slider base 2, a head portion 6 which is provided on the base portion 3B in such a manner that most of the head portion 6 is overlaid on the second land portion 22 and the second air bearing portion 23, and a dummy head portion 7 which is also provided on the base portion 3B in such a manner that most of the dummy head portion 7 is overlaid on the third land portion 23 and the third air bearing 33. End faces of the head portion 6 and dummy head portion 7 are flat and are made lower by a step than the end surfaces of the second air bearing portion 32 and third air bearing portion 33, respectively.

In the conventional head slider 1, a water repellent treatment was provided on only the end surfaces of the first, second and third air bearing portions 31, 32 and 33.

Conventionally, however, in order to reduce the flying amount of the head slider 1 above the disk medium, the surface of the slider base 2 surrounded by the first to third land portions 21 to 23 constitutes a vacuum generating area due to an air flow produced when the head slider 1 flies above the disk medium and, as no water repellent treatment was provided to this vacuum generating area, there used to be caused a problem that dust particles tend to adhere to the vacuum generating area. Namely, as the head slider performs contact, start, stop (CCS) and seek operations, dirt resulting from a liquid lubricant adheres to accumulate on the vacuum generating area of the head slider, and in the event that the amount of dirt so accumulated exceeds an allowable amount, there is caused a problem that part of the dirt so adhering drops onto the surface of the disk medium, thereby triggering a head crash.

Figure 3A:
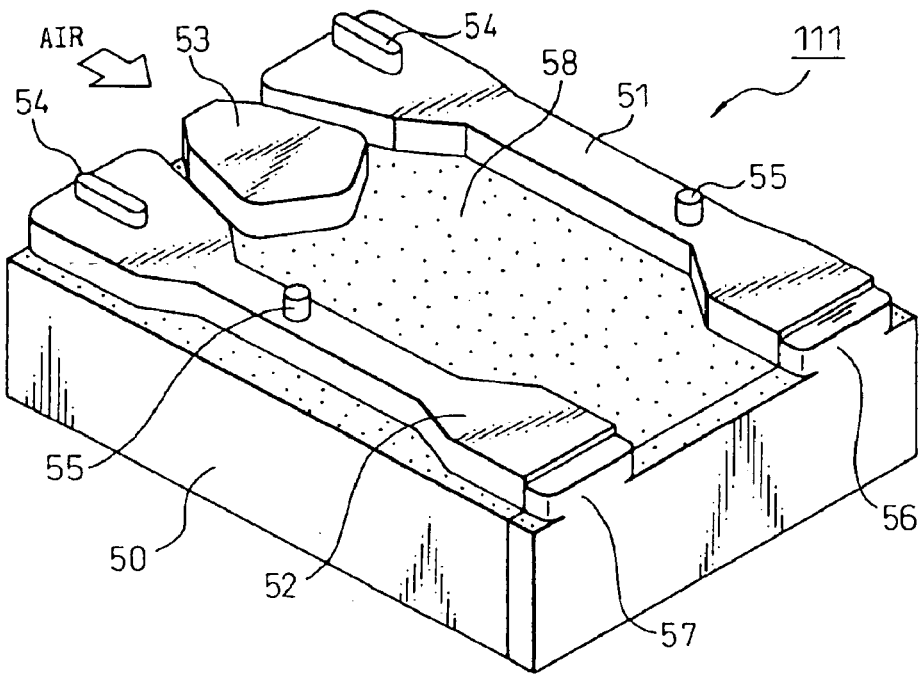
FIG. 3A is a perspective view of a head slider according to a first example of a first embodiment of the present invention as viewed from a bottom side.
Figure 3B:
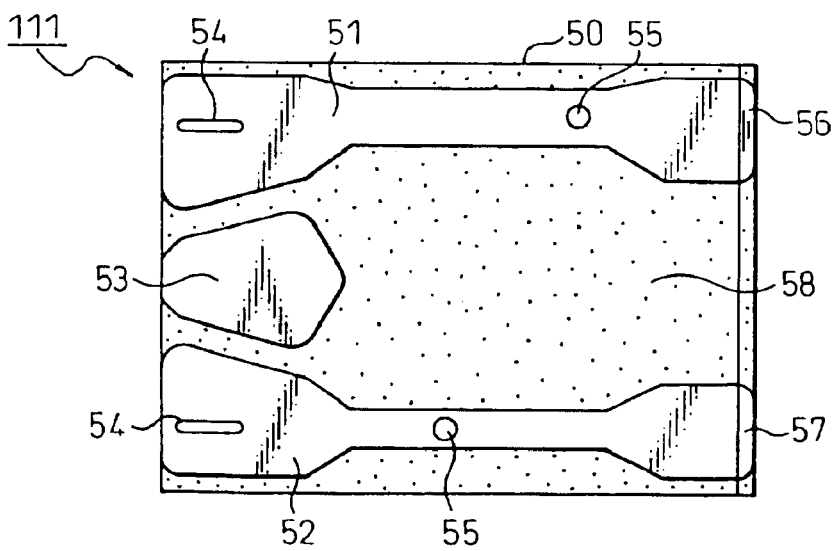
FIG. 3B is a bottom view of the head slider shown in FIG. 3A.

FIGS. 3A, 3B show a head slider 111 according to a first example of a first embodiment of the present invention. In the head slider 111 of this embodiment, two flying rails 51, 52 are provided in the vicinity of sides of a surface (an end surface) 58 of a slider base 50 which confronts a disk medium, and a land portion 53 is provided between the flying rails 51, 52 at an air inlet end. The flying rails 51, 52 and the land portion 53 have the same heights above the slider base 50, and the end faces thereof are flat. Then, as is the case with the conventional head slider, a water repellent treatment is applied to the end surfaces of the flying rails 51, 52 and the land portion 53. In addition, an oval column-like pad 54 and a column-like pad 55 are provided on each of the flying rails 51, 52. Furthermore, a head portion 56 is provided on the flying rail 51 at an air outlet end, and a dummy head portion 57 is provided on the flying rail 52 at the air outlet end.

In the head slider 111 according to the first example of the first embodiment of the present invention which is constructed as has been described heretofore, a water repellent treatment is applied to hatched areas with dots on the end surface 58 of the slider base 50 (areas excluding the flying rails 51, 52 and the land portion 53). This water repellent treatment increases the water repellency of the end surface 58 of the slider base 50 to higher than the water repellency applied to the end surfaces of the flying rails 51, 52 and the land portion 53. Namely, the end surface 58 of the slider base 50 is given a higher water repellency than the water repellency on the end surfaces of the flying rails 51, 52 and the land portion 53.

Thus, in the event that the higher water repellency than the water repellency on the end surfaces of the flying rails 51, 52 and the land portion 53 is given to the end surface 58 of the slider base 50, a vacuum is produced on the end surface of the slider base 50 when the head slider 111 flies, and even in the event that suspending liquid lubricant is carried to the end surface 58 of the slider base 50 by the flow of air, the adhesion of the lubricant is prevented by the water repellency so given.

Figure 4A:
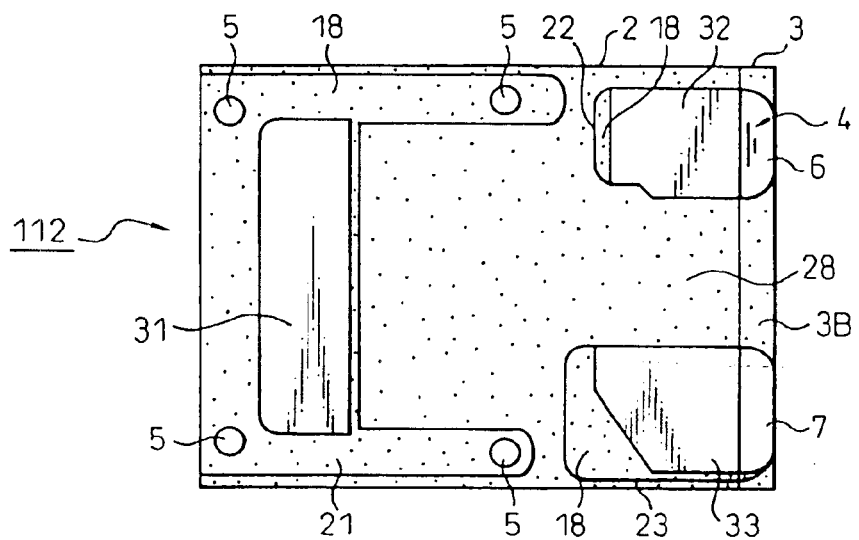
FIG. 4A is a bottom view of a head slider according to a second example of the first embodiment of the present invention.
Figure 4B:
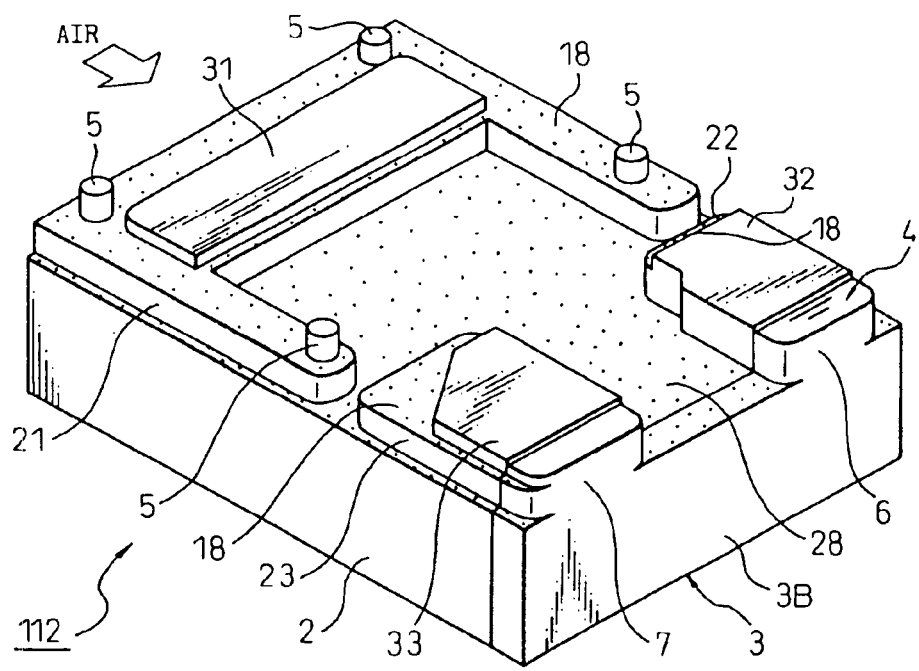
FIG. 4B is a perspective view of the head slider shown in FIG. 4A as viewed from a bottom side.

FIGS. 4A, 4B show a head slider 112 according to a second example of the first embodiment of the present invention. Since the external construction of the head slider 112 of this embodiment looks completely identical to the construction of the conventional head slider 1 described with reference to FIG. 2, like reference numerals are given to like constituent members, and the description thereof will be omitted. A water repellent treatment is provided to end surfaces of first to third air bearing portions 31 to 33 of the head slider 112 of this embodiment as in the case with the conventional example.

In the head slider 112 according to the second example of the first embodiment of the present invention which is constructed as has been described above, a water repellent treatment is provided to end surfaces 18 of first to third land portions 21 to 23 and an end surface 28 (an area excluding the first to third air bearing portions 31 to 33) of the slider base 2, as illustrated by dots. Then, this water repellent treatment increases the water repellency on the end surfaces 18 of the first to third land portions 21 to 23 and the end surface 28 of the slider base 2 higher than the water repellency provided to the end surfaces of the first to third air bearing portions 31 to 33. Namely, a higher water repellency than that provided to the end surfaces of the first to third air bearing portions 31 to 33 is provided to the end surfaces 18 of the first to third land portions 21 to 23 and the end surface 28 of the slider base 2.

Thus, in the event that the higher water repellency than the water repellency on the end surfaces of the first to third air bearing portions is given to the end surfaces 18 of the first to third land portions 21 to 23 and the end surface 28 of the slider base 2, a vacuum is produced on the end surface 28 of the slider base 2 when the head slider 112 flies above the disk medium, and even in the event that suspending liquid lubricant is carried to the end surface 28 of the slider base 2 by the flow of air, the adhesion of the lubricant to the end surfaces 18 of the first to third land portions 21 to 23 and the end surface 28 of the slider base 2 is prevented by virtue of the water repellency so given.

Figure 5A:
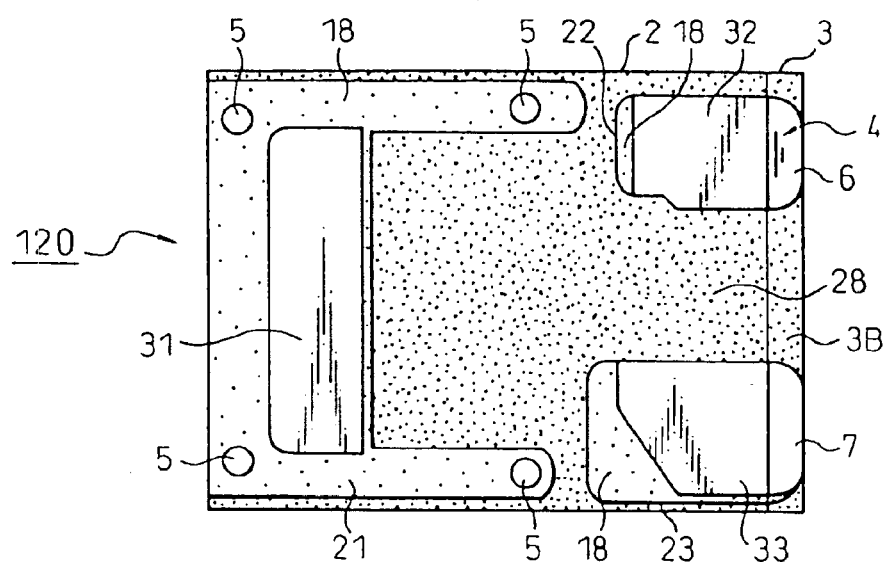
FIG. 5A is a bottom view of a head slider according to a first example of a second embodiment of the present invention.
Figure 5B:
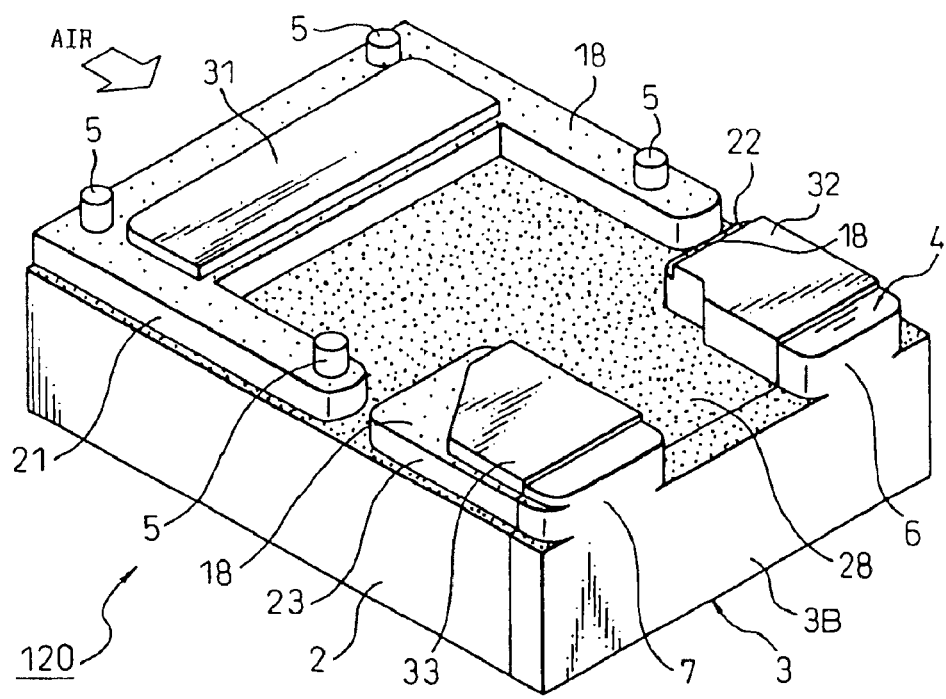
FIG. 5B is a perspective view of the head slider shown in FIG. 5A as viewed from a bottom side.

FIGS. 5A, 5B show the construction of a head slider 120 according to an example of a second embodiment of the present invention. As the external construction of the head slider 120 of this example looks completely identical with the construction of the conventional head slider 1 described with reference to FIGS. 2A, 2B, like reference numerals are given to like constituent members, and the description thereof will be omitted. As in the case with the conventional example, a water repellent treatment is provided to end surfaces of first to third air bearing portions 31 to 33 of the head slider 120 of this example.

In the head slider 120 according to the second embodiment of the present invention which is constructed as has been described above, as in the case with the head slider 112 according to the second example of the first embodiment, a water repellent treatment is provided to end surfaces of first to third land portions 21 to 23 and an end surface 28 of a slider base 2.

The head slider 120 according to the second embodiment of the present invention differs from the head slider 112 according to the second example of the first embodiment in that, due to the water repellent treatment so given, the water repellency on the end surfaces 18 of the first to third land portions 21 to 23 is made higher than the water repellency provided to the end surfaces of the first to third air bearing portions 31 to 33 and, furthermore, in that the water repellency on the end surface 28 of the slider base 2 is made higher than the water repellency on the end surfaces 18 of the first to third land portions 21 to 23. Namely, the water repellencies on the end surfaces of the first to third air bearing portions 31 to 33, the end surfaces 18 of the first to third land portions 21 to 23 and the end surface 28 of the slider base 2 of the head slider 120 according to the second embodiment are made higher in that order. Namely, in the head slider 120 according to the second embodiment, the water repellency of the end surface 28 of the slider base is made to be the highest.

Thus, in the event that the water repellency on the end surface 28 of the slider base 2 is made to be the highest, a vacuum is produced on the end surface 28 of the slider base 2 when the head slider 112 flies above the disk medium, and even in the event that suspending liquid lubricant is carried to the end surface 28 of the slider base 2 by the flow of air, the adhesion of the lubricant to the end surface 28 of the slider base 2 is prevented further by virtue of it having the highest water repellency.

FIG. 6A shows the construction of a head slider 131 according to a first example of a third embodiment of the present invention, and FIG. 6B shows the construction of a head slider 132 according to a second example of the third embodiment of the present invention. As the head slider 131 according to the first example of the third embodiment differs from the head slider 111 according to the first example of the first embodiment only in the manner in which a water repellent treatment is provided and is identical with the head slider 111 in the remaining portions of the construction thereof, like reference numerals are given to like constituent members, and the description thereof will be omitted. In addition, as the head slider 132 according to the second example of the third embodiment differs from the head slider 112 according to the second example of the first embodiment only in the manner in which a water repellent treatment is provided and is identical with the head slider 111 in the remaining portions of the construction thereof, like reference numerals are given to like constituent members, and the description thereof will be omitted.

The head slider 131 according to the first example of the third embodiment differs from the head slider 111 according to the first example of the first embodiment in that the intensity of water repellent treatment is caused to vary. The water repellent treatment is provided uniformly to the end surface 58 of the slider base 50 of the head slider 111 according to the first example of the first embodiment. On the other hand, an end surface 58 of a slider base 50 of the head slider 131 according to the first example of the third embodiment is divided into three areas such as an area 58A, an area 58B and an area 58C as viewed from an air inlet side. Boundary lines between the three areas 58A, 58B, 58C are made normal relative to the flow of air, and the water repellency is intensified in the following order;

flying rails 51, 52<the area 58C<the area 58B<the area 58A.

This water repellent treatment increases the water repellency on the end surface 58 of the slider base 50 most at an air inlet end. Namely, the water repellency of the end surface 58 of the slider base 50 is made the highest at the area to which the lubricating oil adheres most easily. As a result, the effectiveness of the prevention of the adhesion of lubricating oil to the end surface 58 of the slider base 50 is increased.

The head slider 132 according to the second example of the third embodiment differs from the head slider 112 according to the second example of the first embodiment in that the intensity of water repellency is made to vary. In the head slider 112 according to the second example of the first embodiment, the water repellent treatment is provided uniformly to the end surface 28 of the slider base 2. On the other hand, in the head slider 132 according to the second example of the third embodiment, an end surface 28 of a slider base 2 is divided into three areas such as an area 28A, an area 28B and an area 28C. Boundary lines between the three areas 28A, 28B and 28C are made normal relative to the flow of air, and the water repellency is intensified in the following order;

air bearing portions 31 to 33<the area 28C<the area 28B<the area 28A.

The water repellency of end surfaces of first to third land portions 21 to 23 may be made to be equal to the water repellency of the area 28C or to be an intermediate value between the water repellency of the air bearing portions 31 to 33 and the area 28C.

This water repellent treatment increases the water repellency on the end surface of the slider base 2 highest at an air inlet end. Namely, the water repellency of the end surface 28 of the slider base 2 is made highest at the area to which the lubricating oil adheres most easily. As a result, the effectiveness of prevention of the adhesion of lubricating oil to the end surface 28 of the slider base 2 is increased.

Figure 7A:
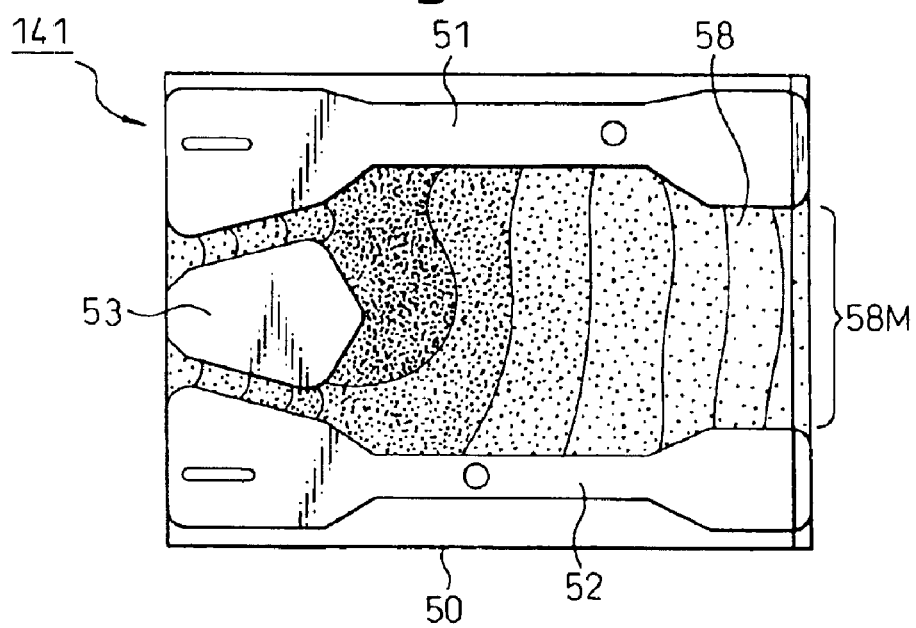
FIG. 7A is a bottom view of a head slider according to a first example of a fourth embodiment of the present invention.

FIG. 7A shows the construction of a head slider 141 according to a first example of a fourth embodiment. As the head slider 141 according to the first example of the fourth embodiment differs from the head slider 111 according to the first example of the first embodiment only in the manner in which a water repellent treatment is provided and is identical with the head slider 111 in the remaining portions of the construction thereof, like reference numerals are given to like constituent members, and a description thereof will be omitted.

The head slider 141 according to the first example of the fourth embodiment differs from the head slider 111 according to the first example of the first embodiment in that the intensity of water repellency is made to vary. In the head slider 111 according to the first example of the first embodiment, the water repellent treatment is provided uniformly to the end surface 58 of the slider base 50, while in the head slider 141 according to the first example of the fourth embodiment, the water repellency on an end surface 58 of a slider base at an area 58M held between flying rails 51, 52 is made to vary in accordance with a vacuum distribution generated in this area when the head slider 141 flies.

Figure 7B:
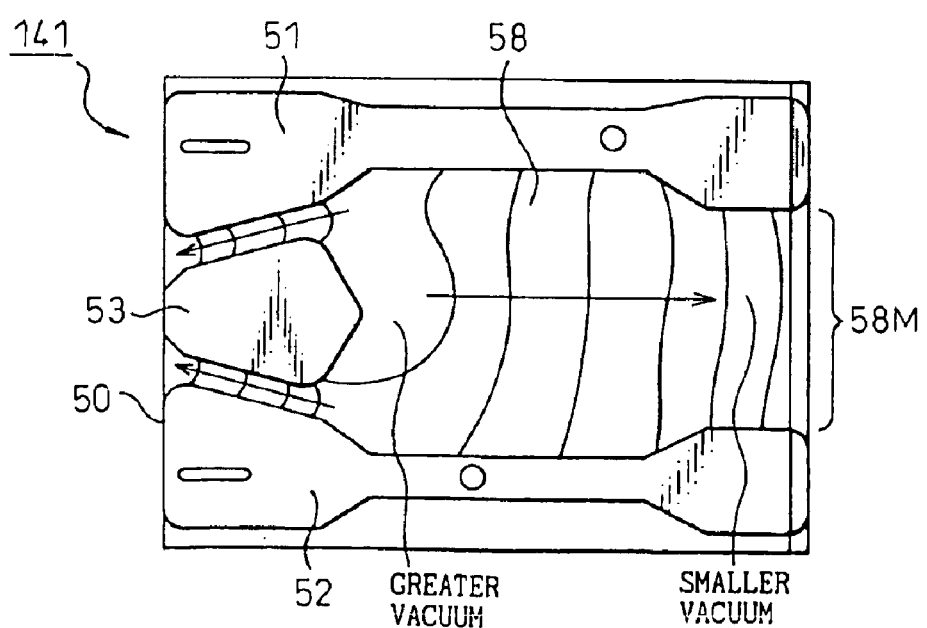
FIG. 7B is a bottom view showing a vacuum distribution on a flying surface of the head slider shown in FIG. 7A when the head slider flies.

FIG. 7B shows a vacuum distribution generated at the area 58M held between the flying rails 51, 52 on the end surface 58 of the slider base 50 while the head slider 141 is flying in the CSS zone in a state in which a disk medium rotates at steady speeds. A vacuum generated at the area 58M becomes maximum at a downstream end of a land portion 53 and becomes smaller toward upstream or downstream of this downstream end of the land portion 53.

Consequently, in the slider head 141 according to the first example of the fourth embodiment, the water repellency becomes higher where the vacuum generated between the area 58M held between the flying rails 51, 52 on the end surface 58 of the slider base 50 becomes larger. As this occurs, the water repellency at a location where the vacuum generated in the area 58M becomes minimum, and the water repellency of positions on the end surface 58 of the slider base 50 which are situated outside the flying rails 51, 52 may be equal to or greater than the water repellency on end surfaces of the flying rails 51, 52.

Due to this water repellent treatment, the water repellency on the end surface 58 of the slider base 50 is made to vary according to the magnitude of a vacuum generated thereat, i.e., in such a manner that the repellency is intensified as the vacuum is increased. Namely, the water repellency is made to become highest at the area to which lubricating oil adheres most easily. As a result, the effectiveness of prevention of lubricating oil to the end surface 58 of the slider base 50 is increased.

FIG. 8A shows the construction of a head slider 142 according to a second example of the fourth embodiment. Since the head slider 142 according to the second example of the fourth embodiment differs from the head slider 112 according to the second example of the first embodiment only in the manner in which a water repellent treatment is provided and is identical with the head slider 112 in the remaining portions of the construction thereof, like reference numerals are given to like constituent members, and a description thereof will be omitted.

The head slider 142 according to the second example of the fourth embodiment differs from the head slider 112 according to the second example of the first embodiment in that the intensity of water repellency is made to vary. In the head slider 112 according to the second example of the first embodiment, the water repellent treatment is provided uniformly to the end surface 28 of the slider base 2, while in the head slider 142 according to the second example of the fourth embodiment, the water repellency at a vacuum generating area 28M at a downstream end of a first land portion 21 on an end surface 28 of a slider base 2 is made to vary according to a vacuum distribution generated at this area when the head slider 142 flies.

FIG. 8B shows a vacuum distribution generated at the vacuum generating area 28M at the downstream end of the first land portion 21 of the slider base 2 when the head slider 142 flies, in the CSS zone, in a state in which a disk medium rotates at a steady speed. A vacuum generated in the area 28M is made to become a maximum in the vicinity of a downstream end of the first land portion 21 and to become smaller toward downstream of this downstream end of the first land portion 21.

Consequently, in the slider head 142 according to the second example of the fourth embodiment, the water repellency becomes higher where the vacuum generated at the vacuum generating area 28M at the downstream end of the first land portion 21 on the end surface 28 of the slider base 2 becomes larger. As this occurs, the water repellency of a portion where the vacuum generated in the area 28M becomes minimum, the water repellency of portions of the end surface 28 of the slider base 2 which are situated outside the first to third land portions 21 to 23, and the water repellency on end surfaces 18 of the first to third land portions 21 to 23 may be equal to or greater than the water repellency on end surfaces of first to third air bearing portions 31 to 33.

Due to this water repellent treatment, the water repellency on the end surface 28 of the slider base 2 is made to vary according to the magnitude of a vacuum generated thereat, i.e., in such a manner that the repellency is intensified as the vacuum is increased. Namely, the water repellency is made to become highest at the area to which lubricating oil adheres most easily. As a result, the effectiveness of prevention of lubricating oil to the end surface 28 of the slider base 2 is increased.

Figure 9A:
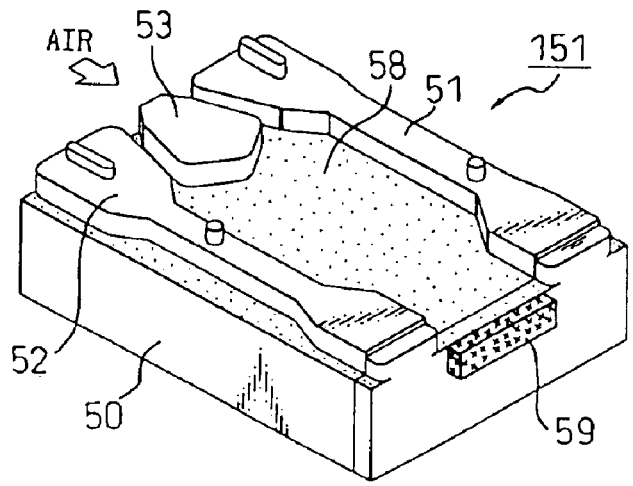
FIG. 9A is a perspective view of a head slider according to a first example of a fifth embodiment of the present invention as viewed from a bottom side.

FIG. 9A shows the construction of a head slider 151 according to a first example of a fifth embodiment of the present invention. Since the head slider 151 according to the first example of the fifth embodiment differs from the head slider 111 according to the first example of the first embodiment only in that a porous polymer member 59 is provided at an air outlet end thereof and is identical with the head slider 111 in the remaining portions of the construction thereof, like reference numerals are given to like constituent members, and the description thereof will be omitted.

In the head slider 151 according to the first example of the fifth embodiment, the porous polymer member 59 is attached to an end face of a slider base 50 at an air outlet end thereof. In this head slider 151, a water repellent treatment is provided to an end surface 58 held between flying rails 51, 52, and hence the end surface 58 has the water repellency. Due to this, dust particles (liquid lubricant) flowing together with air over the end surface are allowed to flow over the end surface 58 without adhering thereto and flows out from an air outlet end of the slider base 50. While the dust particles may be dispersed over a disk medium as they are, in case the dust particles are forcibly trapped, a risk that the dust particles adhere to the surface of the disk medium is eliminated. The porous polymer member 59 is intended to adsorb dust particles so that the dust particles are not dispersed over the surface of the disk medium.

Figure 9B:
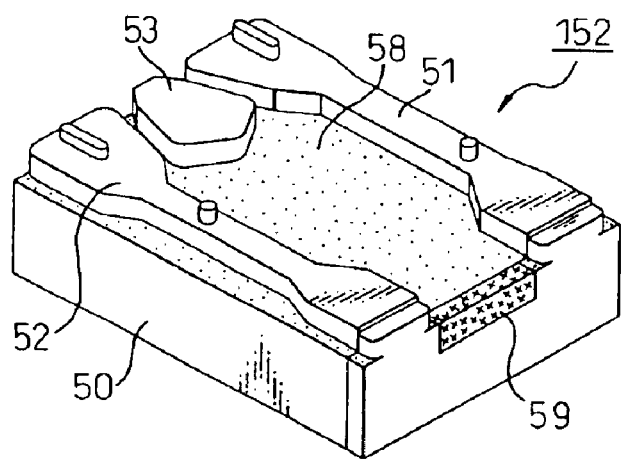
FIG. 9B is a perspective view of a head slider according to a second example of the fifth embodiment of the present invention as viewed from a bottom side.

FIG. 9B shows the construction of a head slider 152 according to a second example of the fifth embodiment of the present invention. This example differs from the head slider 151 according to the first example of the fifth embodiment only in that the porous polymer member 59 is accommodated within a recessed portion formed by removing part of the end face of the slider base 50 at the air outlet end thereof in a thickness direction of the slider base 50. Since the remaining portions of the construction of the head slider 152 are identical with the construction of the head slider 151 according to the first example of the fifth embodiment, like reference numerals are imparted to like constituent members, and the description thereof will be omitted.

Figure 9C:
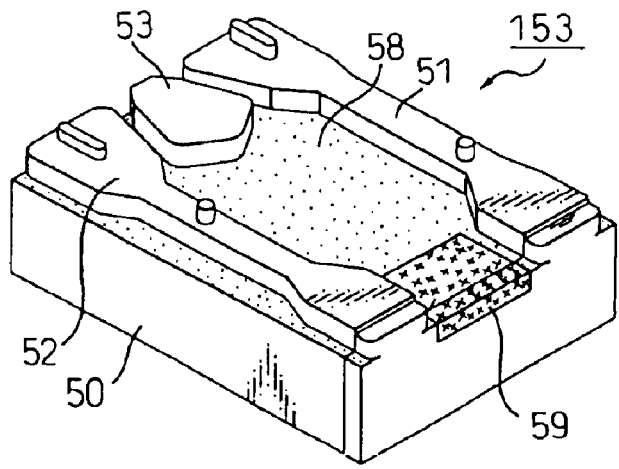
FIG. 9C is a perspective view of a head slider according to a third example of the fifth embodiment of the present invention as viewed from a bottom side.

FIG. 9C shows the construction of a head slider 153 according to a third example of the fifth embodiment. This example differs from the head slider 151 according to the first example of the fifth embodiment only in that the porous polymer member 59 is accommodated within a recessed portion formed by removing part of the surface of the slider base 50 at the air outlet end from the air outlet end toward the air inlet end. Since the remaining portions of the construction of the head slider 153 remain the same as the construction of the head slider 151 according to the first example of the fifth embodiment, like reference numerals are imparted to like constituent members, and the description thereof will be omitted.

Thus, as dust particles flowing out from the air outlet end of the slider base 50 are allowed to be forcibly trapped by the porous polymer member 59 without adhering to the end surface 58 of the slider base 50 which has the water repellency by providing the porous polymer member 59 at the air outlet end of the slider base 50, no dust particles adhere to the disk medium, whereby the contact of dust particles with the head slider is prevented, thereby making it difficult for a head crash to occur.

In addition, this porous polymer member 59 can be attached to all the head sliders according to the first to fourth embodiments, and when attached, the contact of dust particles with the head sliders is prevented, thereby making it difficult for a head crash to occur.

The first to fifth embodiments that have been described heretofore are each constructed such that the water repellency is imparted to the end surface of the head slider so that no dust particles adhere to the head slider. Sixth to fifteenth embodiments that will be described next are each constructed such that an air flow to an end surface 28 of a slider base 2 is improved by improving the first air bearing portion 31 provided on the head slider in the first to fifth embodiments to thereby decrease further the adhesion of dust particles to the end surface 28.

Note that since the basic construction of head sliders that will be described in the sixth to fifteenth embodiments is completely identical with the construction of the conventional head slider 1 described with reference to FIGS. 2A, 2B except for the shape of the first air bearing portion 31, like reference numerals are imparted to like constituent members, and the description thereof will be omitted. In addition, even in the sixth to fifteenth embodiments, similar to the aforesaid embodiments, while a water repellent treatment can be provided to end surfaces 18 of first to third land portions 21 to 23 and the end surface 28 of the slider 2, as the modes for providing a water repellent treatment have already been described before, the description of the water repellency will be omitted here.

Figure 10A:
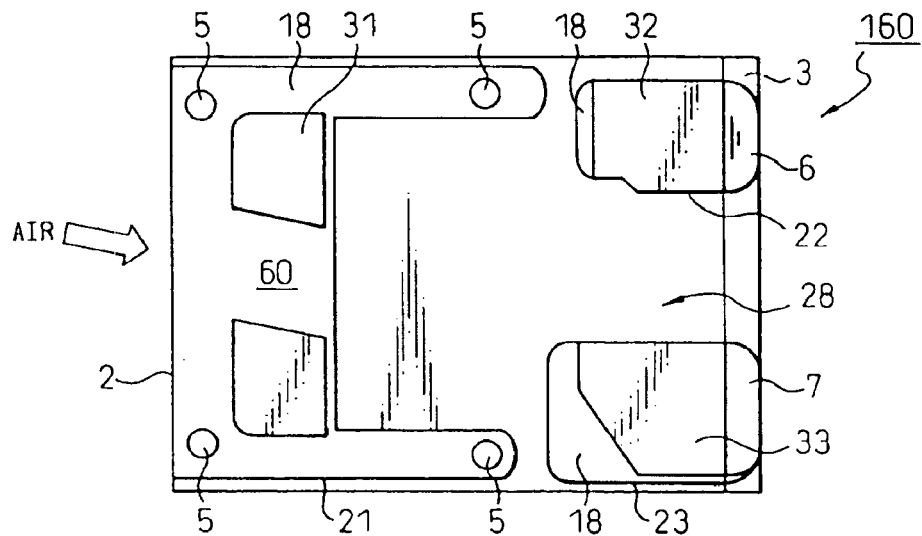
FIG. 10A is a bottom view of a head slider according to a sixth embodiment of the present invention.
Figure 10B:
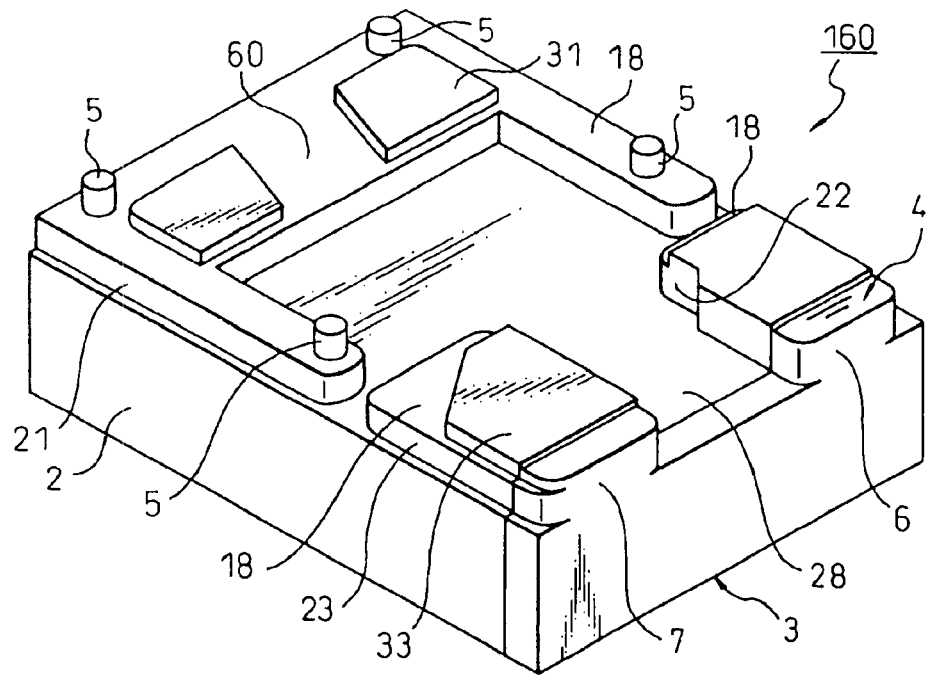
FIG. 10B is a perspective view of the head slider shown in FIG. 10A as viewed from a bottom side.

FIGS. 10A, 10B show the construction of a head slider 160 according to a sixth embodiment of the present invention. In the head slider 160 according to this embodiment, a ventilation groove 60 is formed therein by longitudinally diagonally cutting out a central portion of a first air bearing portion 31. The ventilation groove 60 of this embodiment is formed by cutting out the air bearing portion 31 to such an extent that the groove so cut reaches the end surface 18 of the first land portion 21. In addition, confronting sides of the ventilation groove 60 are made parallel to each other. The inclination angle of side walls of the ventilation groove 60 may be matched to a direction in which air flows in when the head slider 160 is situated at a specific position on a disk medium, for example, at a CSS zone.

Figure 11:
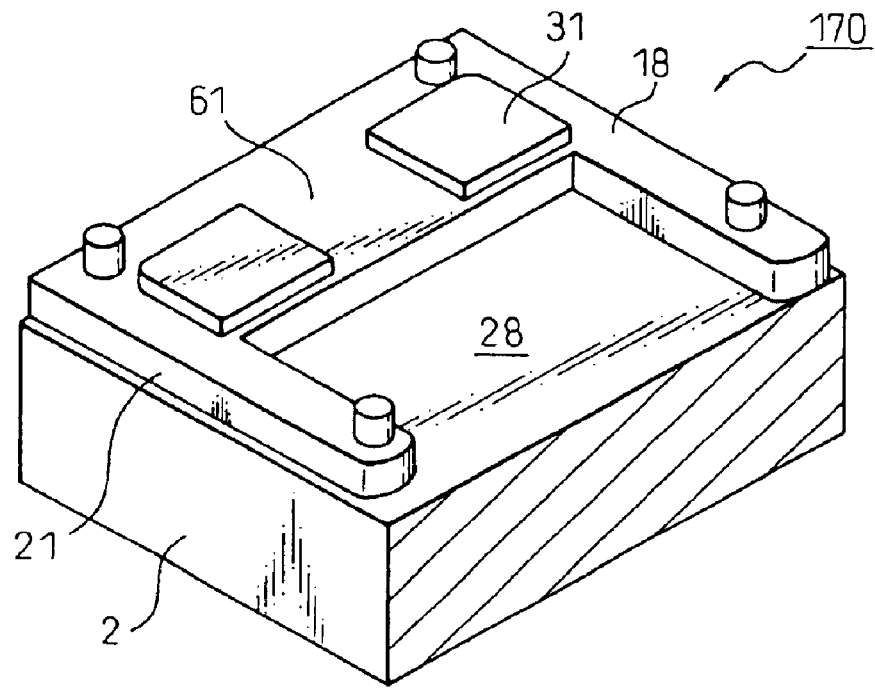
FIG. 11 is a partial perspective view of a characteristic portion of a head slider according to a seventh embodiment of the present invention as viewed from a bottom side.

FIG. 11 shows, partially, the construction of a head slider 170 according to a seventh embodiment of the present invention, and only a main part of the head slider 170 at an air inlet end thereof is shown in the figure. In the head slider 170 according to this embodiment, a central portion of a first air bearing portion 31 is cut out in a longitudinal direction of the head slider 170 so as to form a ventilation groove 61. The ventilation groove 61 of this embodiment is formed by cutting out the first air bearing portion 31 to such an extent that the groove so cut reaches an end surface 18 of a first land portion 21. In addition, confronting sides of the ventilation groove 61 are made parallel to each other.

Figure 12:
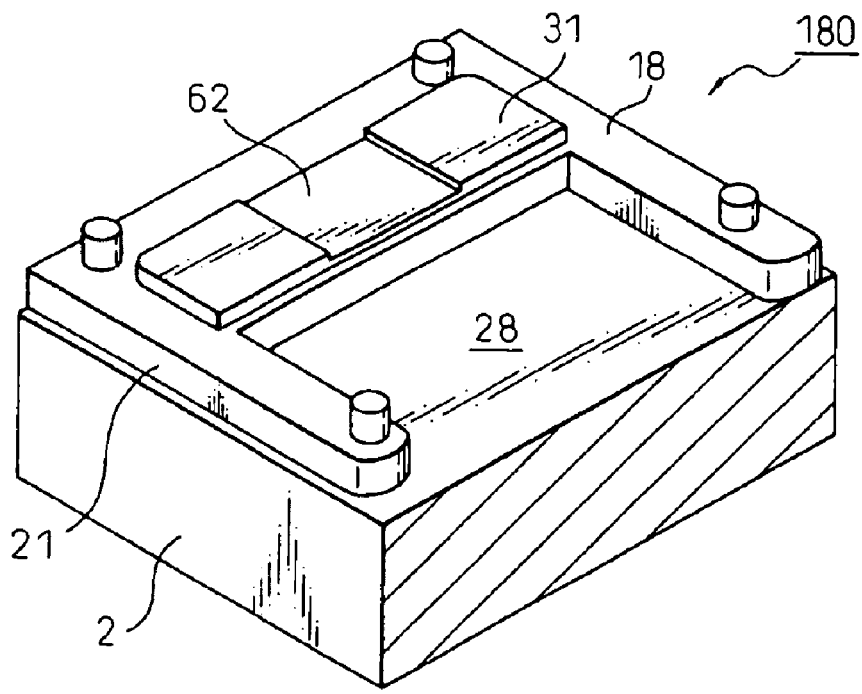
FIG. 12 is a partial perspective view of a characteristic portion of a head slider according to an eighth embodiment of the present invention as viewed from a bottom side.

FIG. 12 shows partially the construction of a head slider 180 according to an eighth embodiment of the present invention, and only a main part of the head slider 180 at an air inlet end thereof is shown in the figure. In the head slider 180 of this embodiment, a central portion of a first air bearing portion 31 is cut out in a longitudinal direction of the head slider 180 so as to form a ventilation groove 62. The ventilation groove 62 of this embodiment is formed by cutting out the first air bearing portion 31 to such a depth that the groove so cut does not reach an end surface 18 of the first land air bearing portion 21. In addition, confronting sides of the ventilation groove 62 are made parallel to each other. The head slider 180 according to the eighth embodiment is such that the depth of the ventilation groove 61 in the head slider 170 of the seventh embodiment is made shallower.

Figure 13:
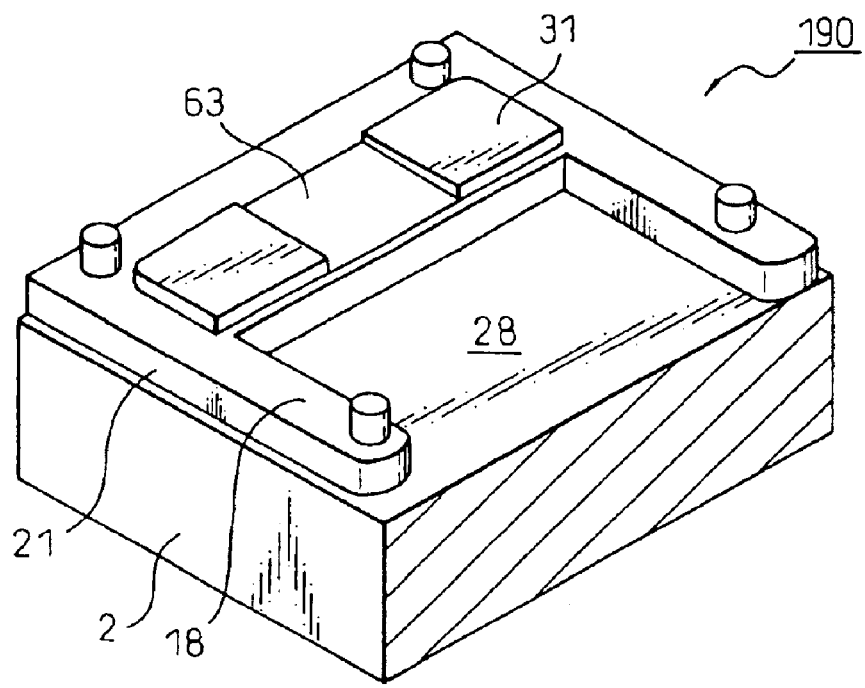
FIG. 13 is a partial perspective view of a characteristic portion of a head slider according to a ninth embodiment of the present invention as viewed from a bottom side.

FIG. 13 shows partially the construction of a head slider 190 according to a ninth embodiment of the present invention, and only a main part of the head slider 190 at an air inlet end thereof is shown in the figure. In the head slider 190 of this embodiment, a central portion of a first air bearing portion 31 is cut out along a longitudinal direction of the head slider 190 so as to form a ventilation groove 63. The ventilation groove 63 of this embodiment is formed by cutting out the first air bearing portion 31 to such a depth that the groove so cut does not reach an end surface 18 of a first land portion 21. In addition, confronting sides of the ventilation groove 63 are made parallel with each other. The head slider 190 of the ninth embodiment is such that the depth of the ventilation groove 62 of the head slider 180 of the eighth embodiment is made gradually deeper along a direction in which air flows.

Figure 14:
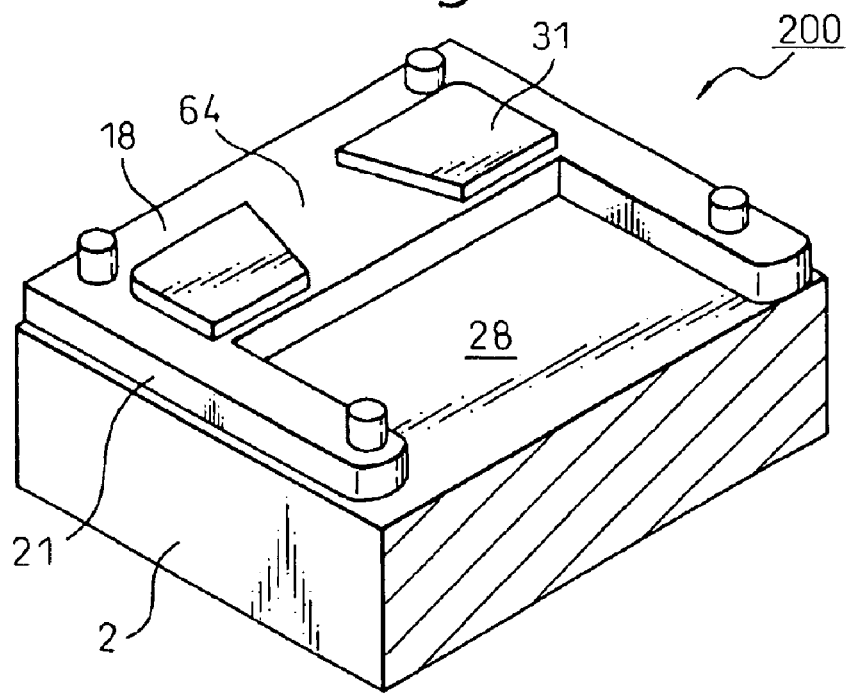
FIG. 14 is a partial perspective view of a characteristic portion of a head slider according to a tenth embodiment of the present invention as viewed from a bottom side.

FIG. 14 shows, partially, the construction of a head slider 200 according to a tenth embodiment of the present invention, and only a main part of the head slider 200 at an air inlet end thereof is shown in the figure. In the head slider 200 according to this embodiment, in order to form a ventilation groove 64, a central portion of a first air bearing portion 31 is cut out in a longitudinal direction of the head slider 200 in such a manner that the width of ventilation groove 64 expands gradually toward an air outlet end of the first air bearing portion 31. The ventilation groove 64 of this embodiment is such that the first air bearing portion 31 is cut out to such an extent that the groove so cut reaches an end surface 18 of a first land portion 21. In addition, sides of the ventilation groove 64 are caused to expand transversely and linearly as they extend in a direction in which air flows.

Figure 15:
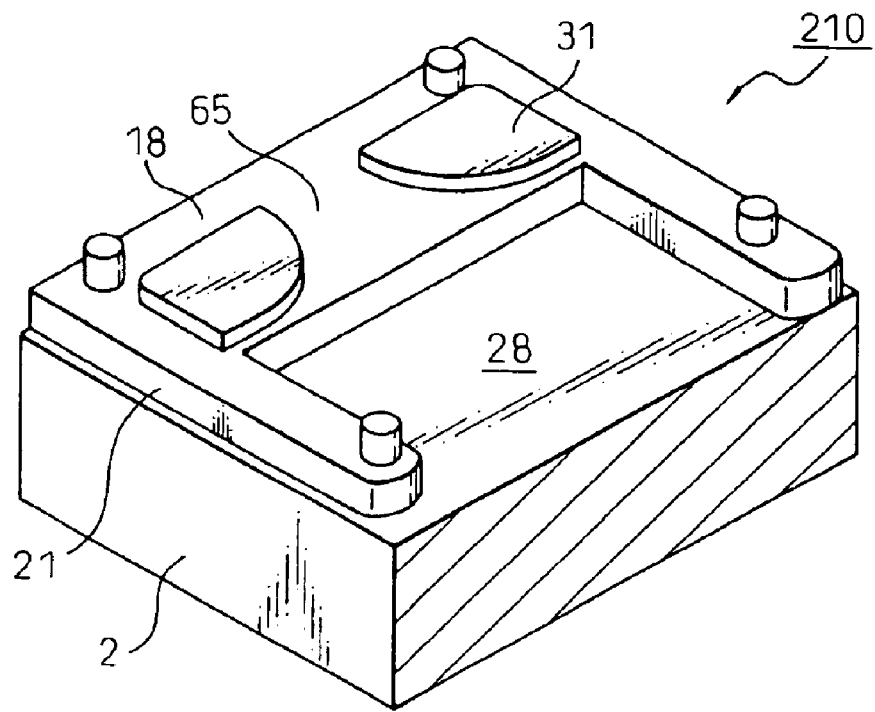
FIG. 15 is a partial perspective view of a characteristic portion of a head slider according to an eleventh embodiment of the present invention as viewed from a bottom side.

FIG. 15 shows partially the construction of a head slider 210 according to an eleventh embodiment of the present invention, and only a main part of the head slider 210 at an air inlet end thereof is shown in the figure. In the head slider 210 of this embodiment, in order to form a ventilation groove 65, a central portion of a first air bearing portion 31 is cut out in a longitudinal direction of the head slider 210 in such a manner that the width of the ventilation groove expands gradually in curved fashion toward an air outlet end of the first air bearing portion 31. The ventilation groove 65 of this embodiment is such that the first air bearing portion 31 is cut out to such an extent that the ventilation groove so cut reaches an end surface 18 of a first land portion 21. In addition, a width between sides of the ventilation groove 65 is made to expand smoothly and transversely as it extends in a direction in which air flows.

Figure 16:
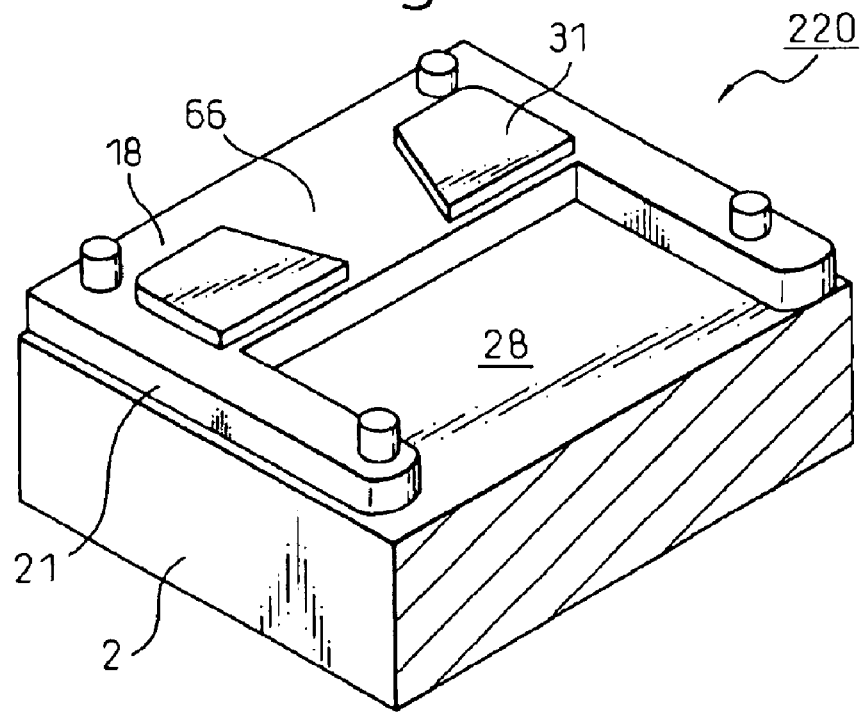
FIG. 16 is a partial perspective view of a characteristic portion of a head slider according to a twelfth embodiment of the present invention as viewed from a bottom side.

FIG. 16 shows, partially, the construction of a head slider 220 according to a twelfth embodiment of the present invention, and only a main part of the head slider 220 at an air inlet end thereof is shown in the figure. In the head slider 220 of this embodiment, in order to form a ventilation groove 66, a central portion of a first air bearing portion 31 is cut out in a longitudinal direction of the head slider 220 in such a manner that the ventilation groove tapers. The ventilation groove 66 of this embodiment is formed by cutting out the first air bearing portion 31 to such an extent that the groove so cut reaches an end surface 18 of a first land portion 21. In addition, a width between sides of the ventilation groove 66 is made to contract linearly gradually as it extends in a direction in which air flows.

Figure 17:
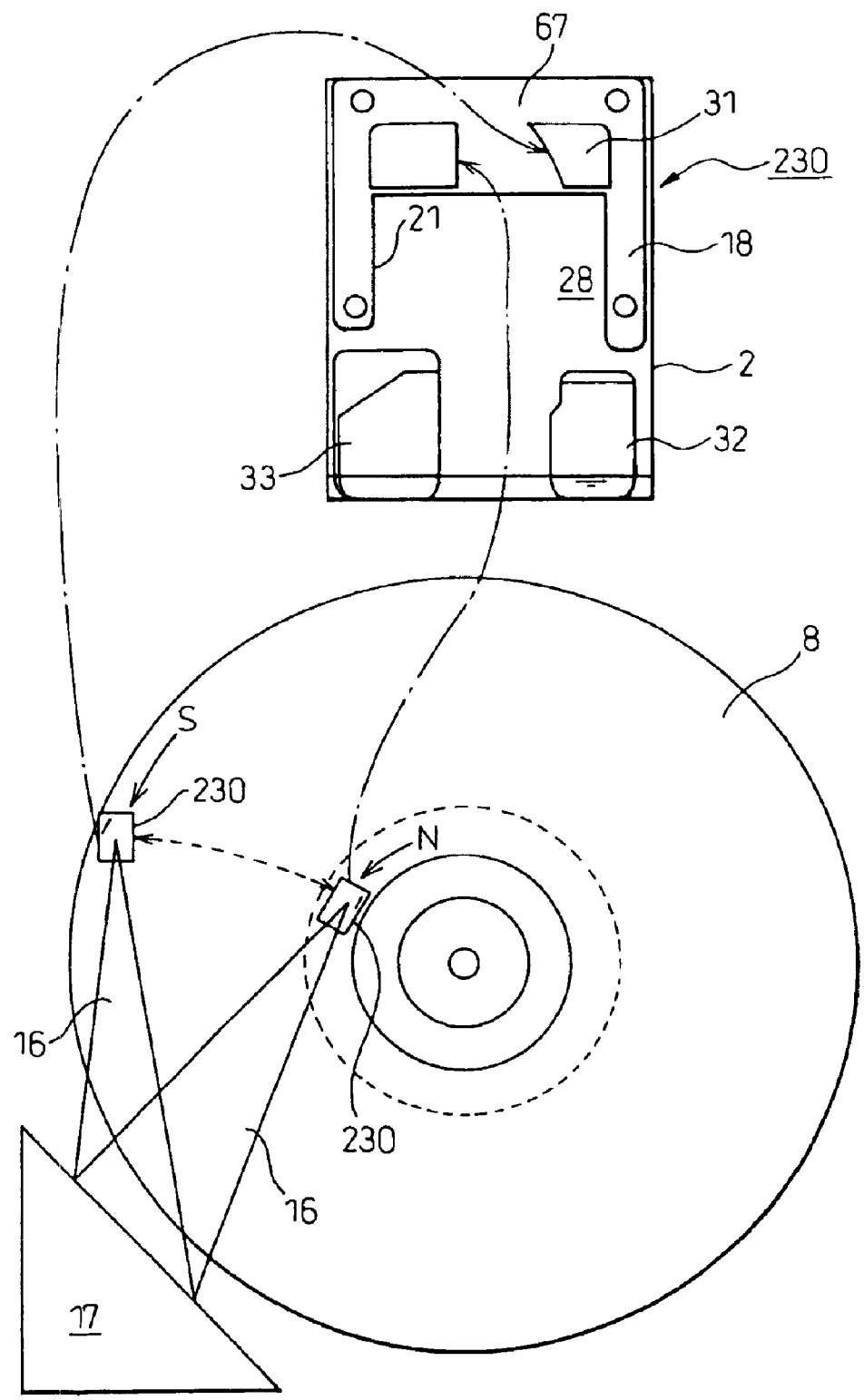
FIG. 17 is an explanatory view showing the basis of the construction of a head slider according to a thirteenth embodiment of the present invention, which includes a bottom view of the head slider.

FIG. 17 shows the construction of a head slider 230 according to a thirteenth embodiment of the present invention, as well as the basis of the construction. In the head slider 230 according to this embodiment, in order to form a ventilation groove 67, a central portion of a first air bearing is cut out in a longitudinal direction of the head slider 230 in such a manner that the width of the ventilation groove expands gradually toward an air outlet end of the first air bearing portion 31. The ventilation groove 67 of this embodiment is such that the first air bearing portion 31 is cut out to such an extent that the groove so cut reaches an end surface 18 of a first land portion 21. The configuration of a side of the ventilation groove 67 of this embodiment, which faces an outer circumferential side of a disk medium 8, is such as to follow a direction S of an air flow when a carriage 16, driven by a voice coil motor 17, is situated on an outer circumferential side of the disk medium 8. In addition, the configuration of a side of the ventilation groove 67 of this embodiment which faces an inner circumferential side of the disk medium 8 is such as to follow a direction N of an air flow when the carriage 16 is situated on an inner circumferential side of the disk medium 8.

Figure 18:
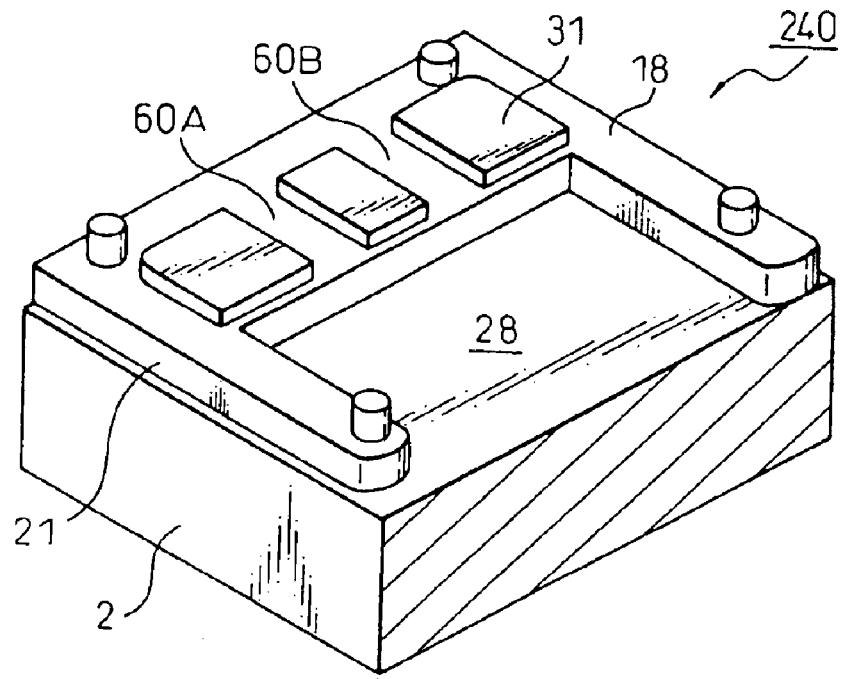
FIG. 18 is a partial perspective view of a characteristic portion of a head slider according to a fourteenth embodiment of the present invention as viewed from a bottom side.

FIG. 18 shows, partially, the construction of a head slider 240 according to a fourteenth embodiment of the present invention, and only a main part of the head slider 240 on an air inlet end thereof is shown in the figure. In the head slider 240 of this embodiment, central portions of a first air bearing portion 31 are cut out along a longitudinal direction of the head slider 240 so as to form two ventilation grooves 68A, 68B. The ventilation grooves 68A, 68B of this embodiment are formed by cutting the central portions of the first air bearing portion 31 to such an extent that the grooves so cut reach an end surface 18 of a first land portion 21. In addition, confronting sides of the ventilation grooves 68A, 68B are made parallel to one another.

Figure 19:
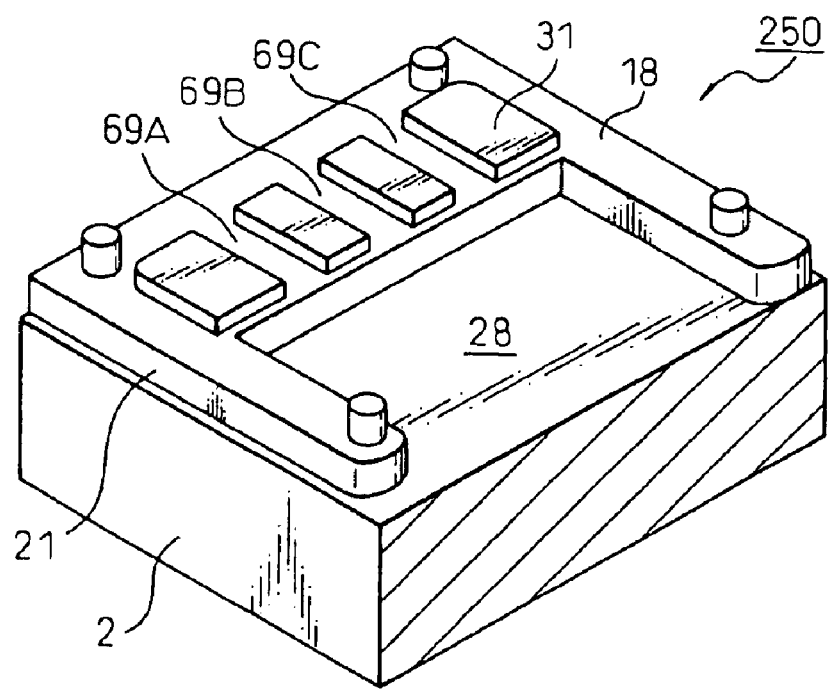
FIG. 19 is a partial perspective view of a characteristic portion of a head slider according to a fifteenth embodiment of the present invention as viewed from a bottom side.

FIG. 19 shows partially the construction of a head slider 250 according to a fifteenth embodiment of the present invention, and only a main part of the head slider 250 at an air inlet end thereof is shown in the figure. In the slider head 250 of this embodiment, central portions of a first air bearing portions are cut out along a longitudinal direction of the head slider 250 so as to form three ventilation grooves 69A, 69B, and 69C. The ventilation grooves 69A to 69C of this embodiment are formed by cutting out the first air bearing portion 31 to such an extent that the grooves so cut reach an end surface 18 of a first land portion 21. In addition, confronting sides of the ventilation grooves 69A to 69C are made parallel to one another.

Thus, while the constructions of the head sliders according to the sixth to fifteenth embodiments have been described heretofore, with the head slider of any of the embodiments so described, air is allowed to flow to the end surface 28 of the slider base 2 smoothly, and as a result, the adhesion of dust particles to the end surface 28 can be suppressed and the adsorption failure of the head slider can be prevented effectively, while the vacuum effect, by virtue of the air flow over the end surface 28, is maintained. In addition, the configurations of the ventilation grooves formed in the first air bearing portion 31 of the head slider 2 according to the embodiments of the present invention are not limited to those disclosed in the embodiments.

Figure 20:
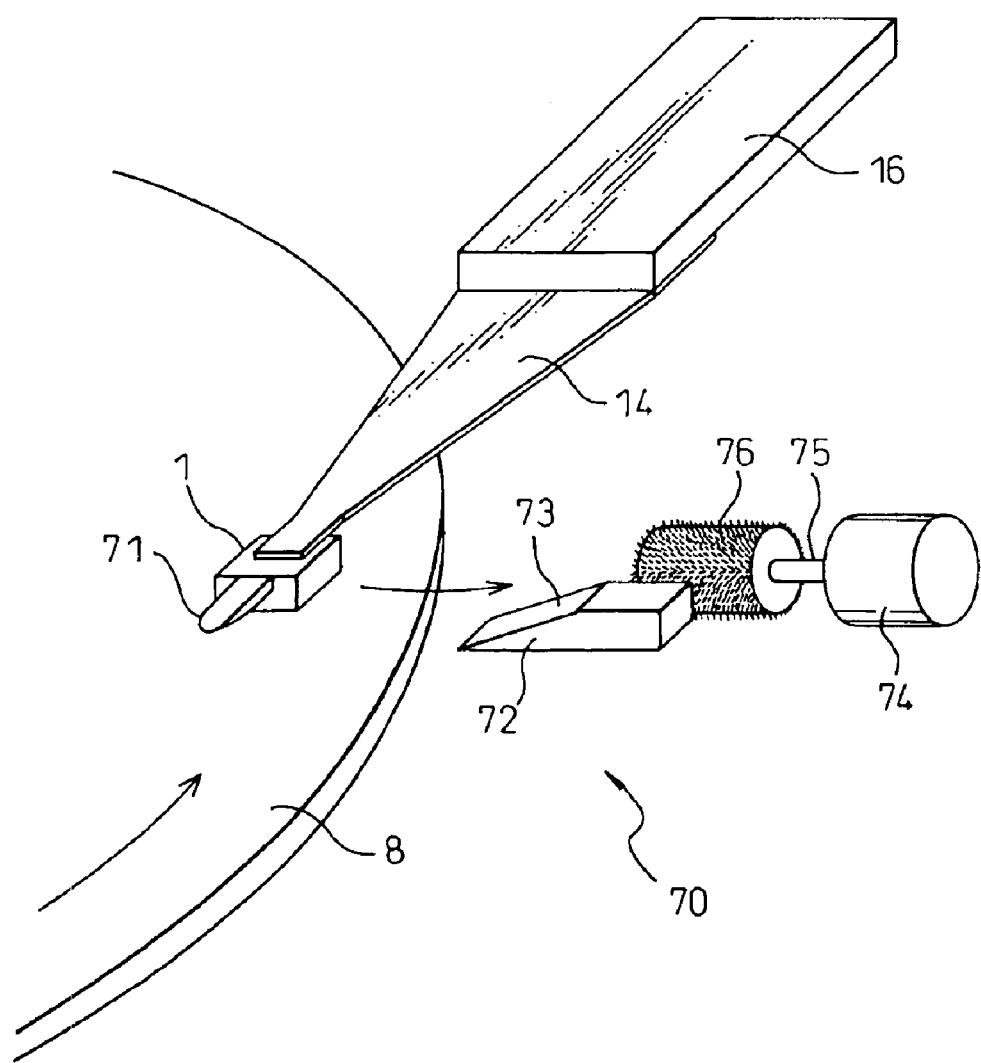
FIG. 20 is a perspective view showing the construction of a cleaning mechanism for removing the dirt of the head slider of a disk drive according to the present invention.

FIG. 20 shows the construction of a cleaning mechanism for removing dirt on a head slider 1 of a disk drive according to the present invention. A cleaning mechanism 70 comprises a guide bar 71, a holding member 72 having a guide slope 73 provided thereon, and a dirt wiping roller 76 attached to a rotating shaft 75 of a motor 74. The guide bar 71 is provided at a free end portion of the head slider 1 attached to a head suspension held on a carriage in such a manner as to protrude therefrom. The holding member 72 is situated outside an outer circumferential portion of a disk medium 8, and the slope 73 is provided on a disk medium side thereof. The dirt wiping roller 76 is situated in the vicinity of the holding member 72 and is driven to rotate by the motor 74 when the head slider 1 is fixed by the holding member 72 so as to remove the dirt on an end surface of the slider base 2 of the head slider 1. The motor 74 and the dirt wiping roller 76 are adapted to move relative to the head slider 1 so fixed.

Figure 21A:
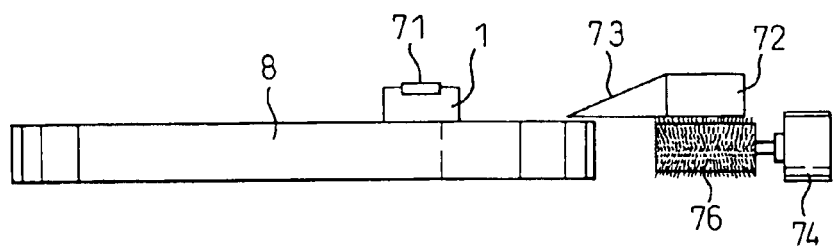

Referring to FIGS. 21A to 21D, the operation of the cleaning mechanism 70 of the head slider 1, which is constructed as has been described above, will be described below. FIG. 21A illustrates a state in which the head slider 1 is situated above the disk medium 8 so as to perform reading from or writing to the disk medium 8. In this state, the dirt wiping roller 76 does not rotate.

Figure 21B:
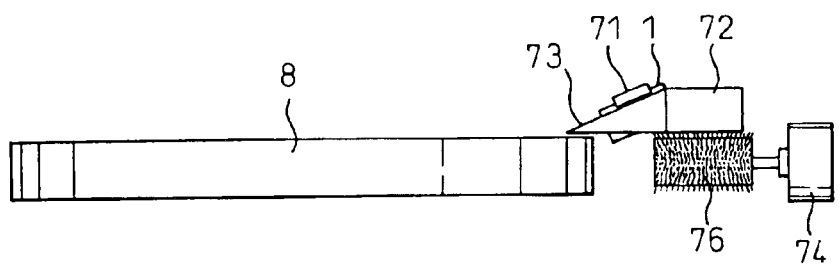
Figure 21C:
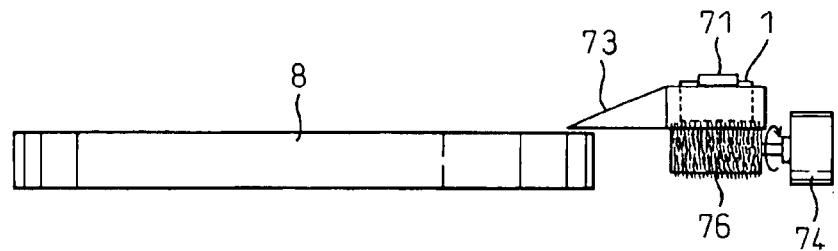
Figure 21D:
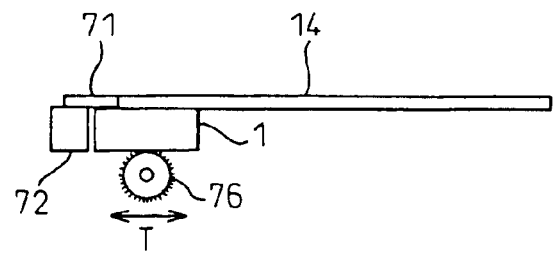

When the head slider 1 is moved radially outwardly to the outer circumference of the disk medium 8 from this state, as shown in FIG. 21B, the guide bar 71 provided on the head slider 1 in such a state as to protrude therefrom, rides on the guide slope 73 of the holding member 72. When the head slider 1 is moved further in the same radially outward direction of the disk medium 8 from this state, the guide bar 71 provided on the head slider 1 in such a manner as to protrude therefrom then rides on a flat portion of the holding member 72, leading to a state shown in FIG. 21C. A state shown in FIG. 21D is the state shown in 21C as viewed from the outside of the disk medium 8. The positions shown in FIGS. 21C, 21D are where the end surface of the head slider 1 is cleaned.

When the head slider 1 is held by the holding member 72 in a manner as has been described above, the motor 74 and the dirt wiping roller 76 are moved, and when the dirt wiping roller 76 comes into contact with the end surface of the head slider 1, the dirt wiping roller 76 is caused to rotate by the motor 74. Then, when the dirt wiping roller 76 is moved in a direction indicated by an arrow T in FIG. 21D, the end surface of the head slider 1 is cleaned by the dirt wiping roller 76 at the cleaning position.

Described next will be a method for providing a water repellent treatment to the end surface of the head sliders described in the first to fifth embodiments of the present invention.

Incidentally, as is seen from the above-described embodiments, most of the pads for reducing the stationary friction force between the head slider and the disk medium are provided at the air inlet end of the head slider, and in many cases few pads are provided on the air outlet end of the head slider. As this occurs, there may be a risk that the end surface of the head slider comes into contact with the disk medium. Then, as this happens, lubricant enters between the end surface of the head slider and the disk medium to thereby cause bridging, leading to a risk that the head slider is adsorbed to the disk medium. To eliminate such a fault, part of a protection film (DLC (diamond-like carbon)) provided on the end surface of the head slider may be grooved so as to form a groove portion. Even in case the disk medium rotates in a reverse direction, whereby the head slider is adsorbed to the disk medium, the adhesion of lubricant to the end surface of the head slider is suppressed by the groove portion so formed, the adsorption of the head slider to the disk medium being thereby prevented.

The method for providing a water repellent treatment according to the present invention is effective not only to the head slider 1 in which the groove is formed in the protection film (hereinafter, referred to as DLC) but also to a head slider 1 in which no groove is formed in the DLC.

Thus, a conventional method and a method according to the present invention for providing a water repellent treatment to the end surface of a head slider 1 will be described first and, then, a conventional method and a method according to the present invention for providing a water treatment to the end surface of a head slider 1 in which no groove is formed in the DLC.

FIG. 22 is a process diagram explaining the steps of a conventional method for providing a water repellent treatment to the end surface of a head slider in which a groove is formed in the surface of a DLC 24. Note that here will be described a method for providing a water repellent treatment to the end surface of the head slider 1 described with reference to FIGS. 2A, 2B in which the land portions 21 to 23 (hereinafter, referred collectively to as the land 20) and the air bearing portions 31 to 33 (hereinafter, referred collectively to as the air bearing 30) are provided on the slider base 2. In addition, the illustration and description of a process for forming the pads 5 are omitted here.

In step 1, a resist R is first applied to the full surface of the slider base 2 of altic (AlTiC) on the surface of which patterns of silicone (Si) and DLC are applied, and after a metal mask is applied to the resist from thereabove, the slider base 2 is exposed to light so that the resist R is left as required.

In step 2, etching is provided to the slider base 2 in this state, so that other portions on the slider base 2 than those on which the resist R is formed are recessed by a step. Etching used at this time is etching utilizing oxygen plasma and CF4 for forming patterns of DLC 24.

In step 3, the resist R is separated. Areas that have appeared then have the same height as the height of the surface of the air bearing 30 that will be described later.

In step 4, portions corresponding to the air bearing 30 are covered with a resist R so as to form the air bearing 30, or so-called resist patterning is performed.

In step 5, etching is performed in this state. This etching is carried out in order to form the air bearing 30.

In step 6, the resist is separated, so that the air bearing 30 is exposed.

In step 7, in order to form the land 20, resist patterning is carried out in which portions corresponding to the land 20 are covered with a resist R.

In step 8, etching is provided in this state, so that the slider base 2 is recessed by another step.

In step 9, the resist R is separated. The portions where the resist remains constitute the air bearing 30, and the recessed portions constitute the end surface 28 of the slider base.

In step 10, a fluorinating treatment (fluorination) is provided fully to the end surface 28 of the slider base so as to provide a low water repellency to the end surface 28 of the slider base uniformly. Etching used at this time is argon etching performed in a gaseous atmosphere containing fluorine.

Since fluorine molecules remain slightly on the end surface 28 of the slider base, in its entirety, by the process as has been described heretofore, the end surface 28 of the conventional slider base is provided with a slight water repellency in its entirety.

Next, a method for providing a water repellent treatment to the end surface of the slider base according to the first embodiment of the present invention will be described with reference to FIG. 23. A method for providing a water repellent treatment to the end surface of the slider base according to the first embodiment of the present invention that will be described here is a method for providing a two-stage water repellent treatment to the flying surface of the head slider 112 according to the second example of the first embodiment of the present invention which is described with reference to FIG. 4 in which the water repellency differs at the air bearing 30 and the other locations.

In addition, as the processes from step 1 to step 4 of the method for providing a water repellent treatment to the flying surface of the head slider 12 according to the first embodiment of the present invention is identical with the processes from step 1 to step 4 of the conventional method for providing a water repellent treatment that is described with reference to FIG. 22, the illustration and description of the processes from step 1 to step 4 will be omitted.

In the method for providing a water repellent treatment to the flying surface of the head slider 112 according to the first embodiment of the present invention, in performing the etching in the conventional step 5, a step 5' is implemented to simultaneously provide a fluorinating treatment. As a result, a fluorination providing a water repellency is provided to the end surface of the portions which constitute the land 20.

Following this, as is the case with the conventional example, processes from step 6 to step 8 are implemented, and after the slider base 2 is recessed by another step through the etching in step 8, a step X is implemented. In this step X, a fluorinating treatment is provided. A fluorination providing a water repellency is provided to the portions of the slider base 2 which are not covered with the resist R. Thereafter, according to the method for providing a water repellent treatment to the end surface of the slider base according to the first embodiment of the present invention, the steps 9 and 10 of the conventional water repellent treatment providing method are implemented.

Thus, according to the method for providing a water repellent treatment to the flying surface of the head slider 112 according to the first embodiment of the present invention, a fluorination is implemented in step 5' which replaces the conventional step 5, and a step X of implementing a fluorination is added between the steps 8 and 9. As a result, the land 20 is subjected to fluorination twice in steps 5 and 10, and the end surface 28 of the slider base is subjected to fluorination twice in steps X and 10 and, therefore, the water repellency of both the land 20 and the end surface 28 of the slider base becomes higher than that of the air bearing 30.

In addition, in the conventional step 5, if no fluorination is implemented, the water repellency is increased higher only at the end surface 28 of the slider base when compared with those at the land 20 and the air bearing 30, and in case the fluorination in step X is made stronger than the fluorination in step 5', the water repellency on the flying surface of the head slider is allowed to increase as it moves from the air bearing 30, then to the land 20 and finally to the end surface 28 of the slider base in that order.

While the water repellency has been provided heretofore to the entirety of the flying surface side of the head slider by performing a fluorination, a head device exists on the flying surface, and there has been a risk that the head device may fail should too strong a fluorination be provided to the flying surface. Consequently, an excessively strong fluorination has not been implemented. On the other hand, according to the present invention, in order to increase the water repellency of the other portions of the flying surface other than the end surfaces of the air bearing portion and the land portion, with the end surface of the air bearing portion including the portion where the head device is provided or the end surfaces of the air bearing portion and the land portion being covered with the resist, a fluorination is provided to the remaining portions. As a result, as the portion where the head device exists only has to be fluorinated once, as is done in the conventional manner, there exists no risk that the head device fails.

In a case where a water repellent treatment is provided in such a manner that the water repellency varies over the end surface 28 of the slider base, as has been done to the head sliders 132 and 142 according to the embodiments which are described with reference to FIGS. 6B and 8A, the number of times of applying the resist may be increased depending upon the number of differences in degree of water repellency.

Referring to FIG. 23, a method for providing a water repellent treatment to the end surface of the slider base according to the second embodiment of the present invention will be described next. FIG. 24 is a process diagram explaining the steps of the method for providing a water repellent treatment to the end surface of the slider base according to the second embodiment of the present invention that is used to provided a water repellent treatment to the end surface of the head slider. Note that here will be described a method for providing a water repellent treatment in two stages in order to vary the water repellency between the air bearing 30 and the other portions on the flying surface of the head slider 112 described with reference to FIGS. 4A, 4B. In addition, the illustration and description of the process of forming the pads 5 are omitted here.

In step A, a resist is first applied to portions where air bearings are to be formed on the surface of the slider base 2 of AlTiC (altic) to which patterns 24 of Si (silicone) and DLC (diamond-like carbon) are applied.

In step B, etching is implemented using a reaction etching gas containing fluorine such as $CF_4$. This etching is generally referred to as RIE (Reactive on-Etching). By using this etching process, the air bearing 30 is formed and the water repellency is provided to the other portions than the air bearing 30.

In step C, the resist of the air bearing 30 is separated.

In step D, a resist R is overlaid on the air bearing 30 and the land so as to cover them. As this occurs, the DLC patterns 24 are also covered with the resist.

In step E, the land 20 and the end surface 28 of the slider base are formed through etching.

In step F, the resist R over the land 20 and the air bearing 30 is separated.

In step G, a resist R is overlaid on the air bearing 30 and the land 20 so as to cover them except for part of the air bearing 30, or a so-called resist pattering is performed.

In step H, etching using oxygen plasma and CF4 is implemented. In this etching, fluorination is implemented at the same time. Due to this, part of the DLC 24 is removed at the same time as the fluorination is carried out, and the end surface 28 of the slider base is fluorinated. Namely, this etching has the same effect as fluorination.

In step I, the resist is separated.

In step J, a fluorination is applied to the entirety of the flying surface of the head slider.

As a result, while the end surface of the air bearing 30 is fluorinated once in step J, the land 20 is fluorinated twice in step B and step J, and the end surface 28 of the slider base is fluorinated twice in step H and step J. Consequently, the water repellency on the flying surface of the head slider becomes similar to that of the head slider 112 shown in FIG. 4.

As this occurs, in case no fluorination is implemented in step B, the water repellency is increased only on the end surface 28 of the slider base when compared with the land 20 and the air bearing 30, and in case the fluorination in step H is made stronger than the fluorination in step B, the water repellency on the flying surface of the head slider can be set so as to increase as it moves from the air baring 30, then to the land 20 and finally to the end surface 28 of the slider base in that order.

In a case where a water repellent treatment is provided in such a manner that the water repellency varies over the end surface 28 of the slider base as has been done to the head sliders 132 and 142 according to the embodiments which are described with reference to FIGS. 6B and 8A, the number of times of applying the resist may be increased depending upon the number of differences in degree of water repellency.

According to the method for providing a water repellent treatment to the end surface of the slider base according to the second embodiment of the present invention, the difference in degree of water repellency can be provided through the 10 steps comprising steps A to J as is the case with the method for providing a water repellent treatment to the end surface of the conventional slider base which comprises 10 steps from steps 1 to 10. In addition, in order to vary the water repellency on the end surface of the slider base area by area, the number of times of applying a resist to the end surface of the slider base may be varied, so that only a fluorination may be applied to a portion where a strongest water repellency is desired to be provided with no resist being applied thereto.

Figure 25:
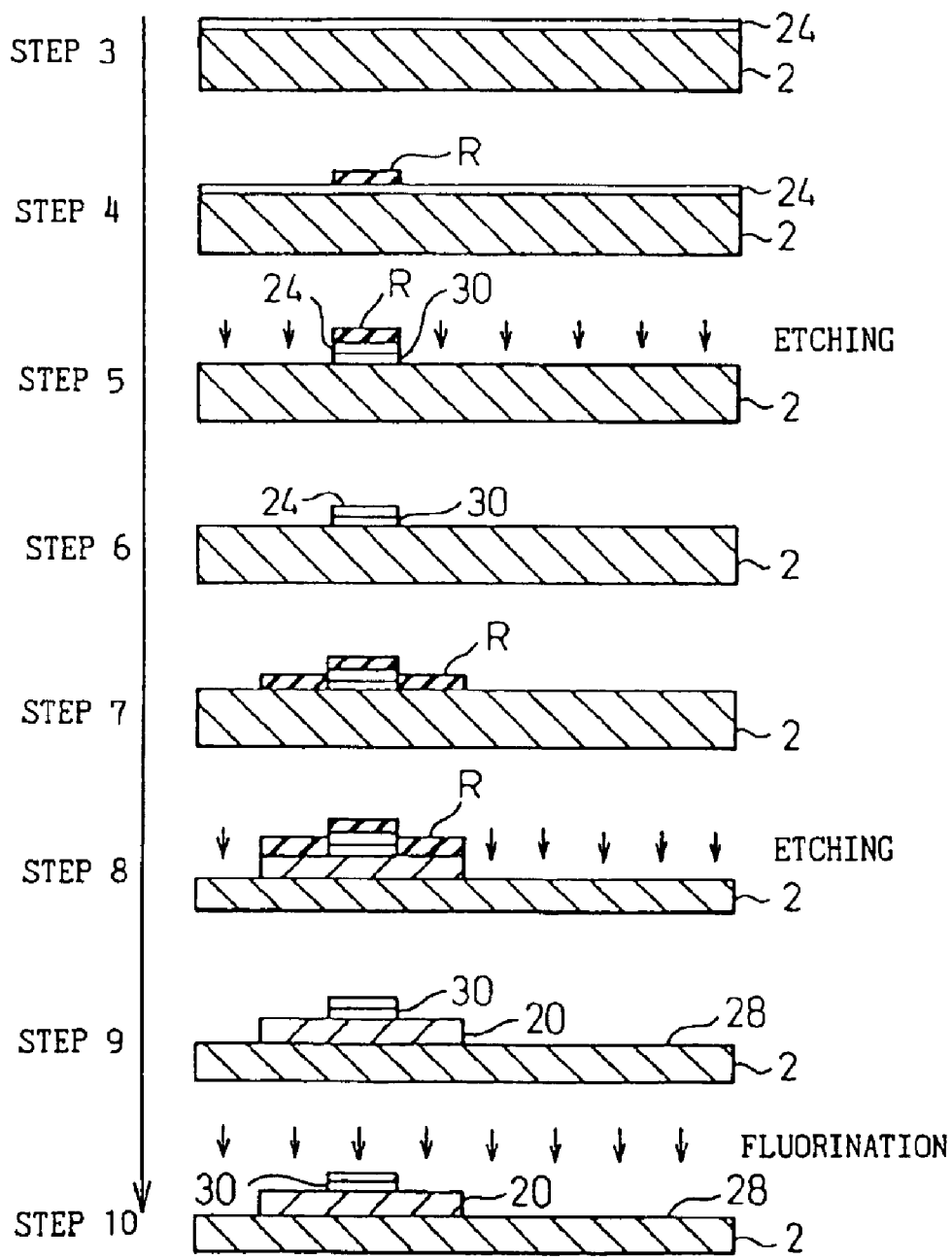
FIG. 25 is a process diagram explaining the steps of a conventional process for providing a water repellent treatment to a bottom surface of a head slider in case where an adsorption preventing recessed portion is not created in a protection film.

FIG. 25 is a process diagram explaining the steps of a conventional method for providing a water treatment to the surface of the head slider when no groove is formed in the surface of the DLC 24. In the event that no groove is formed in the surface of the DLC 24, steps 1 and 2 which are described in FIG. 22 are not necessary, and hence the water repellent treatment is initiated from step 3.

In step 3, a DLC 24 is laminated on the end surface of the slider base 2.

In step 4, resist patterning is implemented in which portions corresponding to the air bearing 30 are covered with a resist R.

In step 5, etching is implemented so as to form the air bearing 30.

In step 6, the resist is separated so as to allow the air bearing 30 to be exposed.

In step 7, resist patterning is implemented in which portions corresponding to the land 20 are covered with a resist R.

In step 8, etching is implemented so as to allow the slider base 2 to be recessed by another step.

In step 9, the resist R is separated so as to form the land 20 and the end surface 28 of the slider base.

In step 10, a fluorination is provided to the entirety of the end surface 28 of the slider base so as to provide a low water repellency uniformly over the end surface 28 of the slider base. Etching that is implemented at this moment is argon etching which is implemented in a gaseous atmosphere containing fluorine.

The conventional slider base 2 provided with a slight water repellency over the entirety of the end surface 28 thereof can be produced through the steps described heretofore.

Figure 26:
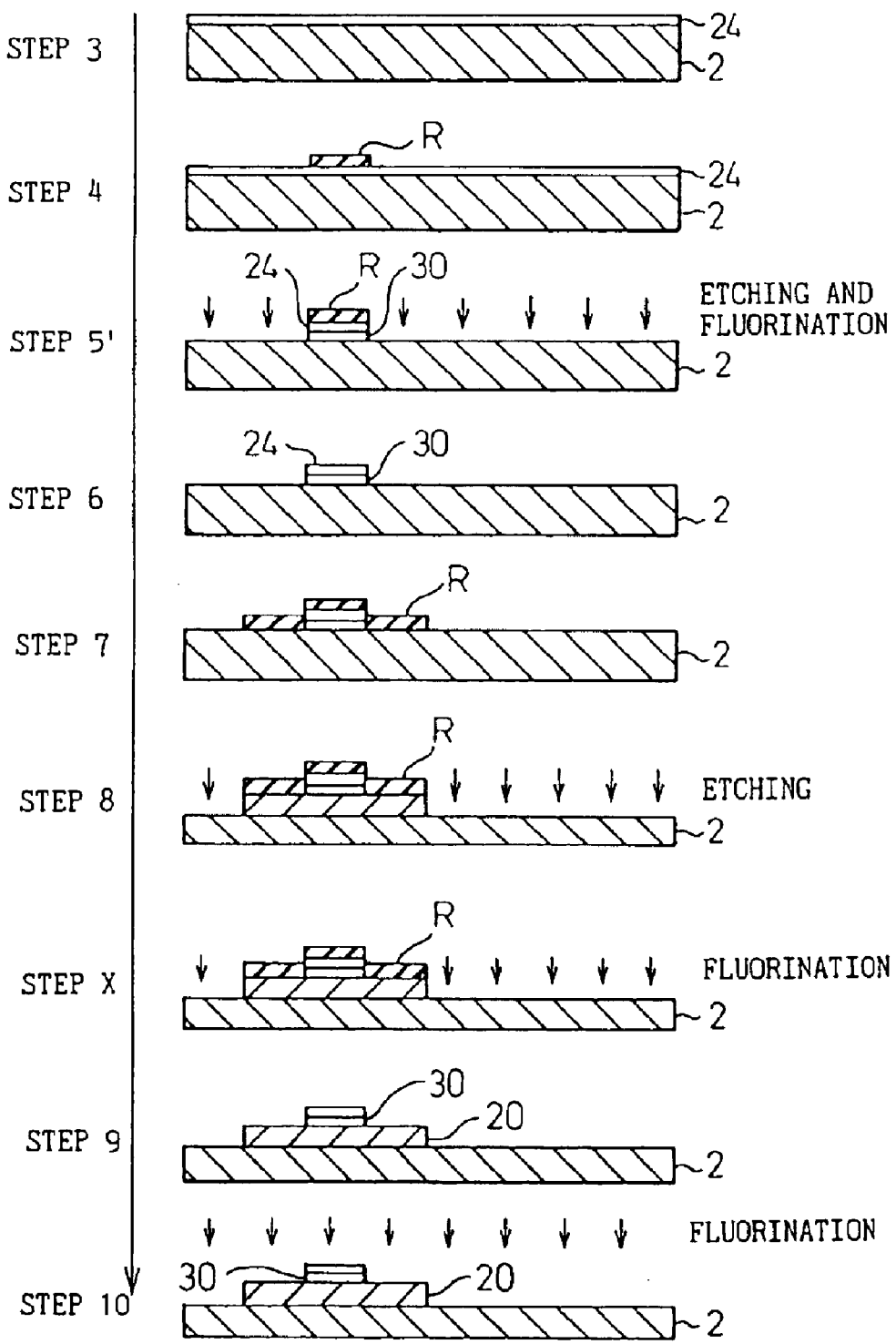
FIG. 26 is a process diagram showing the steps of a first embodiment of a process for providing a water repellent treatment to a bottom surface of a head slider according to the present invention in case where an adsorption preventing recessed portion is not created in a protection film.

Here, referring to FIG. 26, a method will be described for providing a water repellent treatment to the end surface of the slider according to the present invention in a case where no groove is formed in the surface of the DLC 24. A water repellent treatment method of the present invention which will be described here is a modified example to the method for providing a water repellent treatment to the end surface of the slider base according to the first embodiment that is described with reference to FIG. 23, which is a method for providing a water repellent treatment in two stages to the flying surface of the slider base 112 according to the second example of the first embodiment of the present invention in which the water repellency is made to differ at the air bearing 30 and the other locations of the flying surface. Here, too, like step numerals are given to steps like to those of the conventional water repellent treatment method for the description of the two-stage water repellent treatment method.

Processes in steps 3 and 4 are similar to the processes of the conventional water repellent treatment method described with reference to FIG. 25.

In step 5', in etching in the conventional step 5, a step 5' of implementing a fluorination at the same time is executed so as to implement a fluorination providing a water repellency to the end surface of a portion constituting the land 20.

Processes in steps 6 to 8 are identical to those of the conventional method.

In step X which follows step 8, fluorination is implemented. Through this fluorinating treatment fluorination is implemented so as to provide a water repellency to portions of the slider base 2 which are not covered with the resist R.

Processes in steps 9 and 10 are identical to those of the conventional water repellent treatment method.

Thus, even in the water repellent treatment method shown in FIG. 26, as in the case with the method for providing a water repellent treatment to the flying surface of the head slider 112 according to the first embodiment of the present invention which is described with reference to FIG. 23, the fluorination is implemented in step 5' which replaces the conventional step 5, and another fluorination is implemented in step x interposed between steps 8 and 9. As a result, as the land 20 is fluorinated twice in steps 5 and 10 and the end surface 28 of the slider base is fluorinated twice in steps X and 10, the water repellency of both the land 20 and the end surface 28 of the slider base becomes higher than that of the air bearing 30. Consequently, the method according to the present invention can also be applied effectively even in the event that no groove is formed in the surface of the DLC 24.

Note that while the above embodiments describe the head sliders in which the two flying rails and the land portion are provided on the slider base and in which the three air bearing portions and the three land portions are provided, no specific limitation is imposed to the number and shape of air bearings and lands.

INDUSTRIAL FIELD OF APPLICATION

According to the head sliders and the disk drive employing the same head sliders, and the methods for providing a water repellent treatment to the head sliders that have been disclosed in the present invention, the adhesion of dust particles to the flying surface confronting a disk of the head slider in the disk drive when the head slider flies can be suppressed, whereby the reliability of the disk drive can be improved.

What is claimed is:

1. A head slider comprising:

a plurality of flat steps formed at an air inlet end of a flying surface of said head slider accessing a disk medium, said steps facing said disk medium in such a manner as to be stepped gradually from a slider base and a vacuum area formed on said flying surface of said head slider which faces said disk medium at a downstream end of an air flow flowing through said steps; wherein, a first step is formed on an upper surface of said slider base, said first step having the same front end face as a front end face of said slider base and a top flat surface parallel to the upper surface of said slider base, a second step is formed on the top flat surface of said first step, spaced from said front end face, and having a top flat surface which is parallel to said upper surface of said slider base, and, at least a groove for introducing air to said vacuum area is formed in said second step in such a manner that the depth of said groove so formed varies and reaches a maximum at the top flat surface of said first step.

2. A head slider as set forth in claim 1, wherein said groove is formed in such a manner that the direction of said groove becomes parallel to a direction in which air enters said flying surface.

3. A head slider as set forth in claim 2, wherein said direction in which air enters said flying surface is made to match a direction in which air enters in a CSS area.

4. A magnetic disk drive utilizing a head slider as set forth in claim 1.

5. A magnetic disk drive as set forth in claim 4, wherein a head cleaning mechanism for fixing said head slider in a CSS zone or a loading and unloading area where said head slider comes to rest and wiping out dirt adhering to an end portion of said head slider at an air outlet end thereof is provided in the vicinity of said CSS zone or loading and unloading area.

6. A magnetic disk drive as set forth in claim 5, said head cleaning mechanism comprises a guide projection provided at a free end of said head slider, a fixing member for fixing said guide projection when said head slider arrives at said CSS zone or loading and unloading area, a dirt removing member for cleaning said head slider at a position where said head slider is fixed by said fixing member, and an actuator for driving said dirt removing member.

7. A head slider comprising:

a plurality of flat steps formed at an air inlet end of a flying surface of said head slider accessing a disk medium, said steps facing said disk medium in such a manner as to be stepped gradually from a slider base and a vacuum area formed on said flying surface of said head slider which faces said disk medium at a downstream end of an air flow flowing through said steps; wherein, a first step is formed on an upper surface of said slider base, said first step having the same front end face as a front end face of said slider base and a top flat surface parallel to the upper surface of said slider base, a second step is formed on the top flat surface of said first step, spaced from said front end face, and having a top flat surface which is parallel to said upper surface of said slider base, and, at least a groove for introducing air to said vacuum area is formed in said second step in such a manner that the depth of said groove so formed reaches a maximum at the top flat surface of said first step, wherein said groove is formed such that the depth of said groove becomes deeper as said groove extends from the air inlet end toward an air outlet end of said flying surface.

* * * * *